United States Patent
Sirotkin et al.

(10) Patent No.: US 10,721,710 B2
(45) Date of Patent: Jul. 21, 2020

(54) INDOOR POSITIONING ENHANCEMENTS

(71) Applicant: INTEL IP CORPORATION, Santa Clara, CA (US)

(72) Inventors: Alexander Sirotkin, Hod Hasharon (IL); Hyung-Nam Choi, Hamburg (DE); Chandru Aswani, Bangalore (IN); Elad Eyal, Hamburg (DE)

(*) Notice: Subject to any disclaimer, the term of this patent is extended or adjusted under 35 U.S.C. 154(b) by 0 days.

(21) Appl. No.: 16/316,494

(22) PCT Filed: Apr. 26, 2017

(86) PCT No.: PCT/US2017/029607
§ 371 (c)(1),
(2) Date: Jan. 9, 2019

(87) PCT Pub. No.: WO2018/031084
PCT Pub. Date: Feb. 15, 2018

(65) Prior Publication Data
US 2019/0297595 A1   Sep. 26, 2019

Related U.S. Application Data

(60) Provisional application No. 62/373,197, filed on Aug. 10, 2016.

(51) Int. Cl.
*H04W 64/00* (2009.01)
*G01C 21/20* (2006.01)
(Continued)

(52) U.S. Cl.
CPC ........ *H04W 64/003* (2013.01); *G01C 21/206* (2013.01); *H04W 8/02* (2013.01); *H04W 64/00* (2013.01); *H04W 84/12* (2013.01)

(58) Field of Classification Search
CPC ... H04W 64/00; H04W 64/003; H04W 4/023; H04W 88/08; H04W 84/12; H04W 12/06;
(Continued)

(56) References Cited

U.S. PATENT DOCUMENTS

| 2005/0037775 A1* | 2/2005 | Moeglein | G01S 5/0036 455/456.1 |
| 2011/0317579 A1* | 12/2011 | Jones | G01S 5/02 370/252 |

(Continued)

OTHER PUBLICATIONS

3GPP TR 37.857, "3rd Generation Partnership Project; Technical Specification Group Radio Access Network; Study on indoor positioning enhancements for UTRA and LTE (Release 13)", V13.1.0, Dec. 2015, 82 pages.

(Continued)

*Primary Examiner* — Nimesh Patel

(57) ABSTRACT

Systems, methods, and devices for performing wireless local area network (WLAN) fine timing measurement (FTM) are described. An apparatus for a user equipment (UE) includes a memory to store session information for a long term evolution positioning protocol (LPP) session with a location server. The apparatus for the UE also includes one or more baseband processors to decode a provide assistance data LPP message from the location server as part of the LPP session, the provide assistance data LPP message including WLAN assistance information; identify one or more access points (APs) based on the WLAN assistance information; and determine at least one position measurement based on an FTM procedure with the one or more identified APs.

21 Claims, 12 Drawing Sheets

(51) Int. Cl.
*H04W 8/02* (2009.01)
*H04W 84/12* (2009.01)

(58) Field of Classification Search
CPC . H04W 48/16; H04W 4/025; H04W 56/0015; H04W 4/02; H04W 4/024; H04W 4/026; H04W 4/029; H04W 4/043; H04W 4/33; H04W 4/90; H04W 24/10; H04W 4/38; H04W 4/80; H04W 76/50; H04W 40/244; H04W 52/244; H04W 52/283; H04W 72/082; H04W 84/042; H04W 88/02; H04W 72/0453; H04W 36/08; H04W 36/00835; H04W 84/045; H04W 48/20; H04W 36/0061; H04W 36/0083; H04W 36/32; H04W 36/30; H04W 52/0251; H04W 36/165; H04W 72/10; H04W 12/00503; H04W 84/005; H04W 8/205; H04W 36/04; H04W 24/02; H04W 16/20; H04W 28/08; H04W 36/0088; H04W 8/005; H04W 36/0072; H04W 16/06; H04W 88/06; H04W 80/04; H04W 36/0066; H04W 40/246; H04W 12/00516; H04W 92/02; H04W 16/16; H04W 52/40; H04W 36/0011; H04W 16/08; H04W 16/10; H04W 16/18; H04W 28/10; H04W 40/20; H04W 72/12; H04W 74/02; H04W 4/04; H04W 4/30; H04W 12/08; H04W 88/12; G01S 5/0252; G01S 5/0236; G01S 5/14; G01S 5/0063; G01S 13/06; G01S 13/426; G01S 13/534; G01S 13/74; G01S 13/765; G01S 5/00; G01S 5/02; G01S 13/825; G01S 5/0263; G01S 5/10; G01S 5/06; G01S 5/0036; G01S 5/0257; G01S 5/0009; G01S 5/04; G01S 5/12; G01S 5/0045; G01S 5/0226; G01S 5/0242; G01S 5/0284; G01S 1/00; G01S 13/876; G01S 5/0054; G01S 5/0072; H04L 2209/80; H04L 43/10; H04L 5/0055; H04L 63/12; H04L 9/3247; H04L 9/3297; H04L 65/1006; H04L 65/1016; H04L 65/1069; H04L 65/4076; H04L 67/18; H04L 67/22; H04L 5/0048; H04L 12/189; H04L 1/0026; H04L 25/0226; H04L 27/2613; H04L 27/2628; H04L 47/34; H04L 5/005; H04L 5/0023; H04L 5/0073; H04L 2012/5607; H04L 2012/5656; H04L 51/20; H04L 47/12; H04L 41/5009; H04L 43/08; H04L 43/16; H04L 47/2441; H04L 12/2856; H04L 12/66; H04L 69/18; H04L 9/3271; H04L 5/0005; H04B 5/0043; H04B 17/318; H04B 17/382; H04M 3/5116; H04M 2250/10; H04M 2250/12; H04M 1/72522; H04M 1/72572; Y02D 70/1224; Y02D 70/1262; Y02D 70/142; Y02D 70/144; Y02D 70/146; Y02D 70/164; Y02D 70/00; Y02D 70/23; Y02D 70/40; Y02D 70/22; Y02D 70/26; Y02D 70/122; Y02D 70/1242; Y02D 70/1222; Y02D 70/168; Y02D 70/24; Y02D 70/25; Y02D 70/30; G06Q 20/3224; G06Q 30/0205; G06Q 30/0224; G06Q 30/0233; G06Q 30/0255; G06Q 30/0261; G06Q 30/0267; H04J 11/0093; H04J 3/0641; H04J 3/0661; H04J 11/0069; H04J 13/0062; H04J 67/22

See application file for complete search history.

(56) References Cited

U.S. PATENT DOCUMENTS

| | | | |
|---|---|---|---|
| 2014/0253385 A1* | 9/2014 | Amizur | G01S 5/14 |
| | | | 342/387 |
| 2015/0304814 A1* | 10/2015 | Pandey | H04W 4/023 |
| | | | 455/456.2 |
| 2017/0272900 A1* | 9/2017 | Do | H04W 4/185 |

OTHER PUBLICATIONS

3GPP TS 36.355, "3rd Generation Partnership Project; Technical Specification Group Radio Access Network; Evolved Universal Terrestrial Radio Access (E-UTRA); LTE Positioning Protocol (LPP) (Release 12)", V12.5.0, Dec. 2015, 126 pages.
Open Mobile Alliance, "LPP Extensions Specification", Draft Version 2.0, Jul. 25, 2016, 415 pages.
PCT/US2017/029607, International Search Report and Written Opinion, dated Jul. 31, 2017, 13 pages.

* cited by examiner

INDOOR POSITIONING ENHANCEMENTS

RELATED APPLICATIONS

This application is a national stage filing under 35 U.S.C. § 371 of International Patent Application No. PCT/US2017/029607, filed Apr. 26, 2017, which claims priority to U.S. Provisional Patent Application No. 62/373,197, filed Aug. 10, 2016, each of which is hereby incorporated by reference herein in its entirety.

TECHNICAL FIELD

The present disclosure generally relates to determining a location or a position of a device, such as a mobile user equipment device.

BACKGROUND

Wireless mobile communication technology enables communication of mobile user equipment devices, such as smartphones, tablet computing devices, laptop computers, and the like. Mobile communication technology may enable connectivity of various types of devices, supporting the "Internet of Things," for example.

Knowledge of the location of a mobile user equipment device is useful for a variety of purposes including, for example, emergency services (e.g., an emergency call), to support Radio Resource Management functions, and/or location-based services. Since mobile user equipment devices are mobile, their location is not fixed. So the location of a mobile user equipment device must be determined intermittently and/or dynamically.

DETAILED DESCRIPTION

Figure 1:
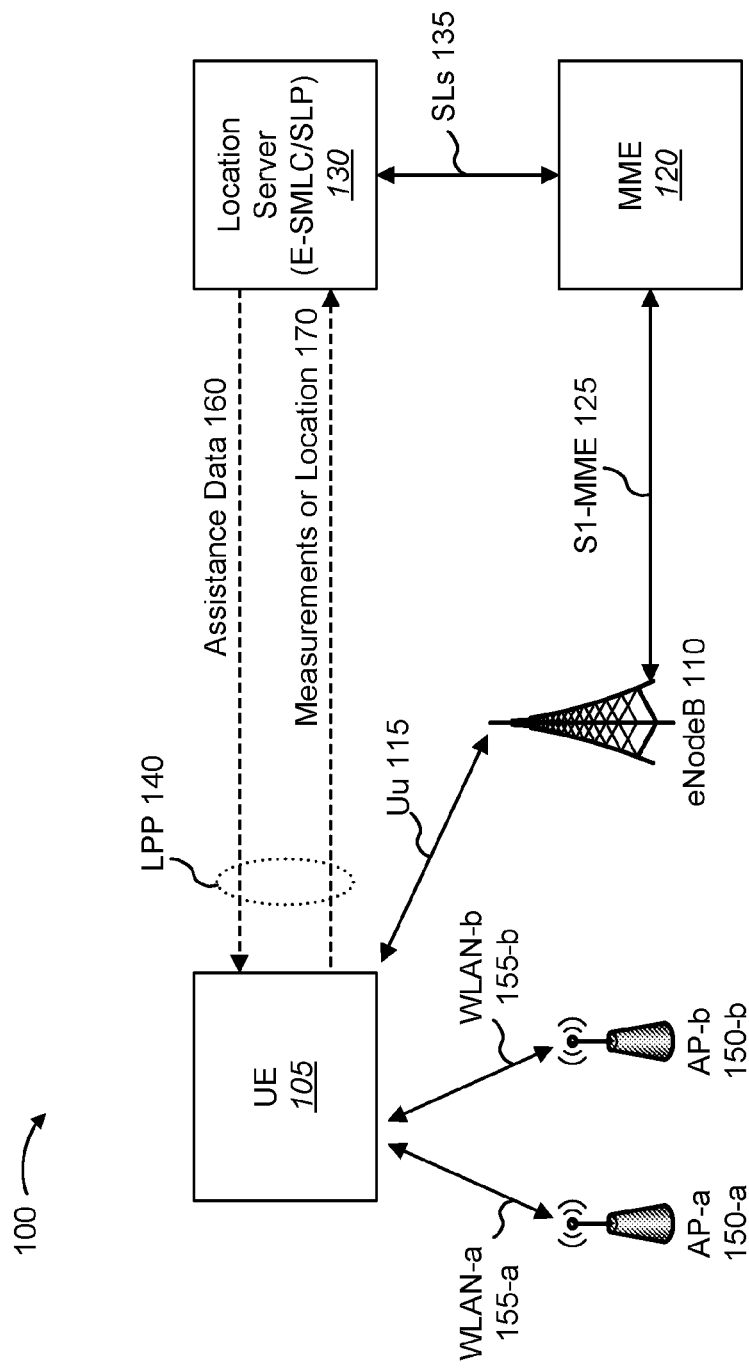
FIG. 1 is a block diagram illustrating an example of an environment in which the present systems and methods may be implemented.

Wireless mobile communication technology uses various standards and protocols to transmit data between a base station and a wireless communication device. One of these standards and protocols is the 3rd Generation Partnership Project (3GPP) long term evolution (LTE). LTE defines the air interface (e.g., LTE-Advanced, fifth generation (5G), etc.) that is used in the Evolved Universal Mobile Telecommunications System (UMTS) Terrestrial Radio Access Network (E-UTRAN) as well as the supporting E-UTRAN and core network architecture (e.g., Evolved Packet Core (EPC)). The E-UTRAN consists of one or more evolved Node Bs (eNodeB or eNB), which communicate wirelessly with mobile user equipment devices (e.g., user equipment (UE)) and interface with the EPC and other eNBs. Together, a UE, the E-UTRAN, and the EPC form the Evolved Packet System (EPS), where the UE accesses the EPC via the E-UTRAN.

There are many situations and/or scenarios in which it is beneficial and/or important to know the location of a UE. For example, it is beneficial to know the location of the UE for emergency call positioning, Radio Resource Management, and/or location-based services. So positioning support was introduced into the 3GPP standards. To increase positioning accuracy when UEs are indoors (for when emergency calls are made from inside structures, for example), methods for indoor positioning were also introduced into the 3GPP standards. For example, 3GPP has standardized basic Wireless Local Area Network (WLAN) fine timing measurement (FTM) support as part of the Release-13 work initiative (WI) on Indoor Positioning Enhancements for UTRA and LTE. The basic WLAN FTM support introduced in Release-13 as part of the Indoor Positioning Enhancements for UTRA and LTE WI included support for WLAN Round Trip Time (RTT) measurements with accuracy of up to tenths of nanoseconds. Release-13 FTM supported only the standalone and the UE-assisted techniques, in which the network may request the UE to report RTT measurements without network assistance.

Although Release-13 provides for WLAN positioning techniques, in Release-13 the UE performs the WLAN positioning techniques in a complete standalone mode (e.g., without any network assistance). WLAN positioning techniques include identifying a set of WLAN access points (APs) (referred to hereafter in the singular form as AP or in the plural form as APs) and performing one or more measurements (e.g., received signal strength indicator (RSSI), FTM Round Trip Time (RTT)) with at least a subset (e.g., at least three) of APs.

The step of identifying/discovering a set of APs and selecting at least a subset of those APs to use for FTM measurements may be a power intensive, processing intensive, and/or time intensive step. For example, without any foreknowledge about the accessibility and/or capability of neighboring APs, a UE must blindly search for APs that are both accessible and capable of performing FTM measurements. In other words, the UE must attempt to connect to an AP to see if it is accessible. If the AP is accessible, then the UE can proceed with determining if the AP is capable of performing FTM measurements. If the AP is not accessible or not capable of performing FTM measurements, then the UE may try again with a different AP. It is appreciated that this blind searching approach has many drawbacks (e.g., has a high probability of inefficiency due to the inefficiencies of discovering an AP as well as the inefficiencies of pursuing an ineligible AP). These inefficiencies (e.g., power inefficiencies, processing inefficiencies, and/or time inefficiencies) are compounded for each eligible AP that is needed for location accuracy (3 APs for two-dimensional (2D) positioning or 4 APs for three-dimensional (3D) positioning, for example).

In addition to the above inefficiencies, the UE must negotiate with each eligible AP to select the FTM algorithm that will be used when performing FTM measurements with that particular eligible AP. In view of the foregoing, it is appreciated that the blind search for eligible APs as set forth in Release-13 (and as maintained in the standalone mode of Release-14, for example) has some drawbacks in terms of efficiency.

Not all of the objectives of that WI were completed in Release-13. So 3GPP approved a follow up Release-14 WI on Further Indoor Positioning Enhancements for UTRA and LTE. The present systems and methods relate to these Further Indoor Positioning Enhancements for UTRA and LTE.

In the present systems and methods, the network (a location server in the EPC, for example) may store data (e.g., wlan-DataSet-r14) about a set of APs. The data may include a list (e.g., wlan-AP-List-r14) that provides information for APs in the data set. For each AP in the data set the data may include information (e.g., WLAN-AP-Data-r14) for an AP that includes an identifier (e.g., wlan-AP-Identifier-r14, the Basic Service Set Identifier (BSSID) and optionally Service Set Identifier for the wireless network served by the AP) and/or location information (e.g., wlan-AP-Location-r14) that includes fields such as latitude (e.g., latitude-r14), latitude uncertainty (e.g., latitudeUncertainty-r14), longitude (e.g., longitude-r14), longitude uncertainty (e.g., longitudeUncertainty-r14), altitude (e.g., altitude-r14), altitude uncertainty (e.g., altitudeUncertainty-r14), datum (e.g., datum-r14), floor number (e.g., floorNumber-r14), height above floor (e.g., heightAboveFloor-r14), and/or height above floor uncertainty (e.g., heightAboveFloorUncertainty-r14). Each of these fields is described in further detail below (in the WLAN-AP-Data field descriptions, for example).

The data may also define the superset of all channels supported by all APs in the list. In some cases, the data may separately define the superset of all channels supported in the 5 Gigahertz (GHz) band (e.g., supportedChannels-11a, those of type 802.11a) and the superset of all channels supported in the 2.4 GHz band (e.g., supportedChannels-11bg, those of type 802.11b or 802.11g). In addition, the data may also define a purge time (e.g., purgeTime-r14), which is defined in further detail below.

The network may provide at least a portion of the data to a UE to assist the UE in performing FTM measurements. The data (e.g., assistance data) may allow the UE to identify which APs are accessible and capable for FTM measurements. The data may also allow the UE to know the channels that are supported by an AP (which channel the UE should use for contacting the AP). It is appreciated that the UE can use this assistance data to quickly and efficiently identify and perform FTM measurements with eligible APs, thus avoiding the inefficiencies associated with the blind search for eligible APs.

If needed (for UE-based operation where the UE uses an algorithm to determine its own location, for example), the data may allow the UE to know the locations (in terms of a 2D latitude and longitude, or in terms of a 3D latitude, longitude, and altitude and/or floor number and/or height above the floor, for example) of the APs so that the UE can determine its own location (using triangulation, trilateration, etc., for example).

WLAN FTM described in this disclosure and as set forth in the Release-14 enhancements has three different operating modes. These modes are standalone mode, UE-assisted mode, and UE-based mode. In the standalone mode, which was set forth in Release-13 and described above, the UE performs WLAN FTM without any network assistance. In Release-14 the UE-assisted mode was enhanced to allow for network assistance data, and the UE-based mode was introduced and allows for network assistance data. In UE-assisted mode, the UE performs WLAN FTM with or without network assistance and provides the measurements to the network, which uses the measurements (along with other measurement information (e.g., Observed Time Difference of Arrival (OTDOA), Global Navigation Satellite System (GNSS), and/or Bluetooth, etc.), for example) to determine the position (e.g., location) of the UE. In UE-based mode, the UE performs WLAN FTM with or without network assistance and determines its own location estimate based on the measurements and information about the location of the APs.

As noted above, the present systems and methods enable the use of network assistance data for WLAN FTM. For example, the present systems and methods define the Stage-3 LTE Positioning Protocol (LPP) enhancements to support UE-assisted and UE-based positioning with network assistance data.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

FIG. 1 is a block diagram illustrating an example of an environment 100 in which the present systems and methods may be implemented. In particular, the environment 100 illustrates an architecture applicable to the positioning (e.g., WLAN FTM positioning) of a UE 105 with E-UTRAN access (via an eNodeB 110, for example).

The environment 100 includes the UE 105, the eNodeB (eNB) 110, a Mobility Management Entity (MME) 120, and a location server 130 (e.g., an Enhanced Serving Mobile Location Centre (E-SMLC) and/or Secure User Plane Location (SUPL) Location Platform (SLP)). The UE 105 is coupled to the eNB 110 via a Uu air interface 115. The eNB 110, which is part of the E-UTRAN, is coupled to the MME 120 via an S1-MME interface 125, which is a control plane interface for delivering signaling protocols between the eNB 110 and the MME 120. The MME 120 is coupled to the location server 130 via an SLs interface 135, which is the interface between the MME 120 and the E-SMLC (e.g., the location server 130).

The UE 105 does not have direct communication with the location server 130. Instead an LTE Positioning Protocol (LPP) session 140 is used between the location server 130 and the UE 105 in order to transfer assistance data 160 or obtain location-related measurements or a location estimate (e.g., measurements or location 170). LPP is a point-to-point protocol that allows the LPP session 140 to provide direct communication between the location server 130 and the UE 105 even though the actual communication path goes over the Uu air interface 115, the S1-MME interface 125 and the SLs interface 135. In other words, the LPP session 140 is transparent to the eNB 110 and the MME 120 because of the point-to-point nature of the LPP protocol.

The environment 100 also includes one or more WLAN APs (e.g., AP-a 150-a and AP-b 150-b). The UE 105 may have a separate WLAN interface 155 with each AP 150. For example, the UE 105 may communicate with AP-a 150-a via WLAN-a interface 155-a and may communicate with AP-b 150-b via WLAN-b interface 155-b.

Figure 2:
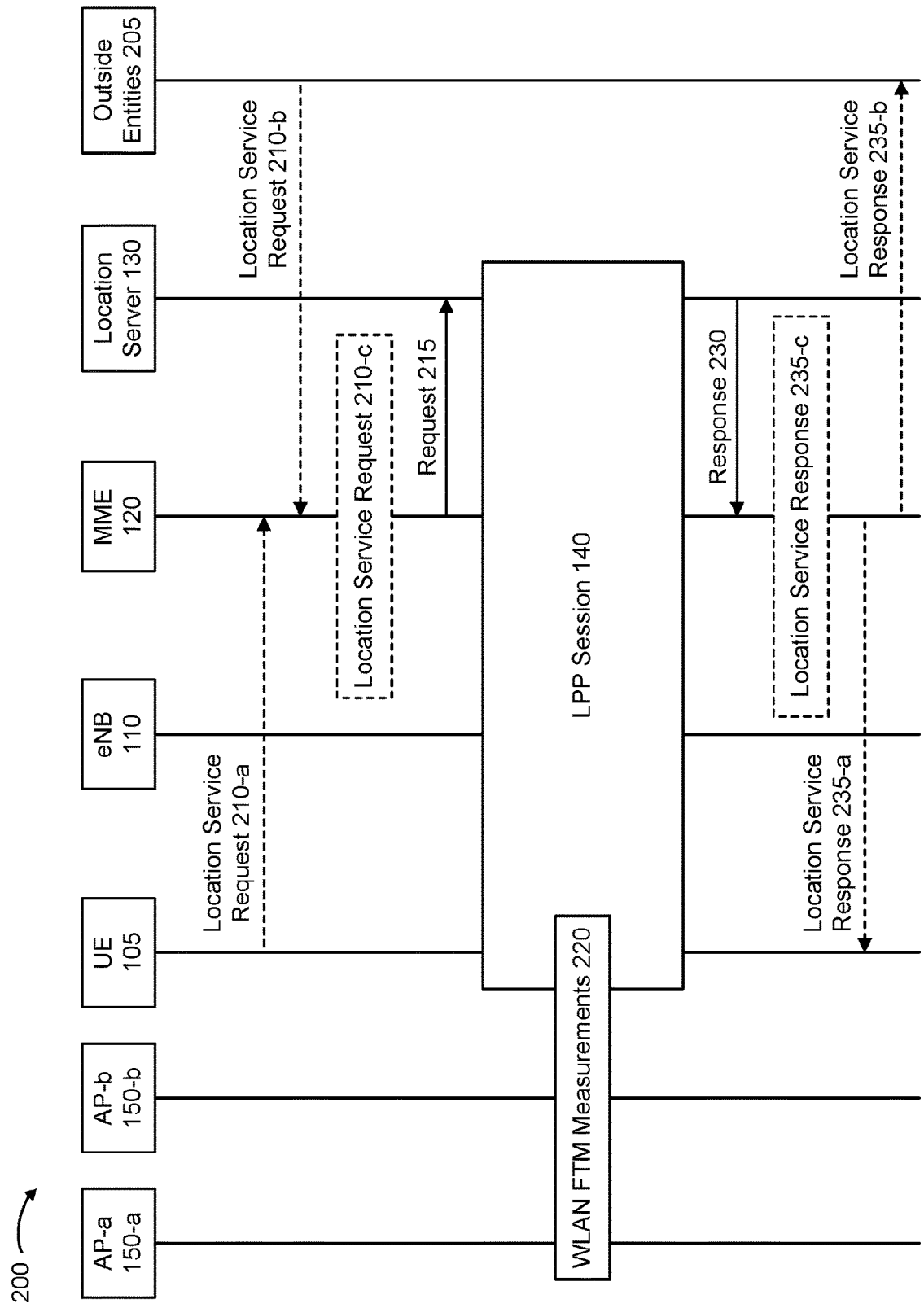
FIG. 2 illustrates an example of a ladder diagram illustrating an exemplary scenario in which the present systems are implemented.

FIG. 2 illustrates an example of a ladder diagram 200 illustrating an exemplary scenario in which the present systems are implemented. In some embodiments, the UE 105, eNB 110, MME 120, location server 130, AP-a 150-a, and AP-b 150-b correspond with the entities discussed with respect to FIG. 1. Also included is outside entities 205, which include devices and services that are outside of the EPC (that are in or a part of the Internet, for example).

In one example, the MME 120 may determine that a location request should be made. This determination may come as a result of a location service request 210-a from the UE 105, from a location service request 210-b from an outside entity 205, and/or a location service request 210-c made by the MME 120 itself. In response to the determination that a location request should be made, the MME 120 may send a request 215 to the location server 130 (e.g., E-SMLC). The location server 130 may form and/or participate in an LPP session 140 with the UE 105. As part of the LPP session 140, the location server 130 may send an LPP-RequestLocationInformation message to the UE 105. In addition the location server 130 may send an LPP-ProvideAssistanceData message with network assistance data (e.g., assistance data 160) to the UE 105. As part of the positioning procedure, the UE 105 may use the network assistance data and may engage in WLAN FTM measurements 220 with one or more APs (e.g., AP-a 150-a and AP-b 150-b) based on the network assistance data.

The procedural details for performing WLAN FTM measurements 220 are well known in the art and are not covered in detail herein. In general, FTM allows a station (STA) (e.g., wireless station, such as UE 105) to accurately measure the Round Trip Time (RTT) between it and another STA. FTM in the WLAN standards (e.g., IEEE Draft P802.11REVmc_D8.0) provides for increased timestamp resolution (in the 0.1 nanoseconds (ns) range) as compared to traditional WLAN timing measurement (TM) (which has timestamp resolution in the 10 ns range). As a result of the increased timestamp resolution, FTM provides the positioning accuracy (e.g., 1-3 meter accuracy, sub-meter accuracy) needed for location sensitive applications (to support the strict emergency calling positioning requirements, for example).

Figure 3:
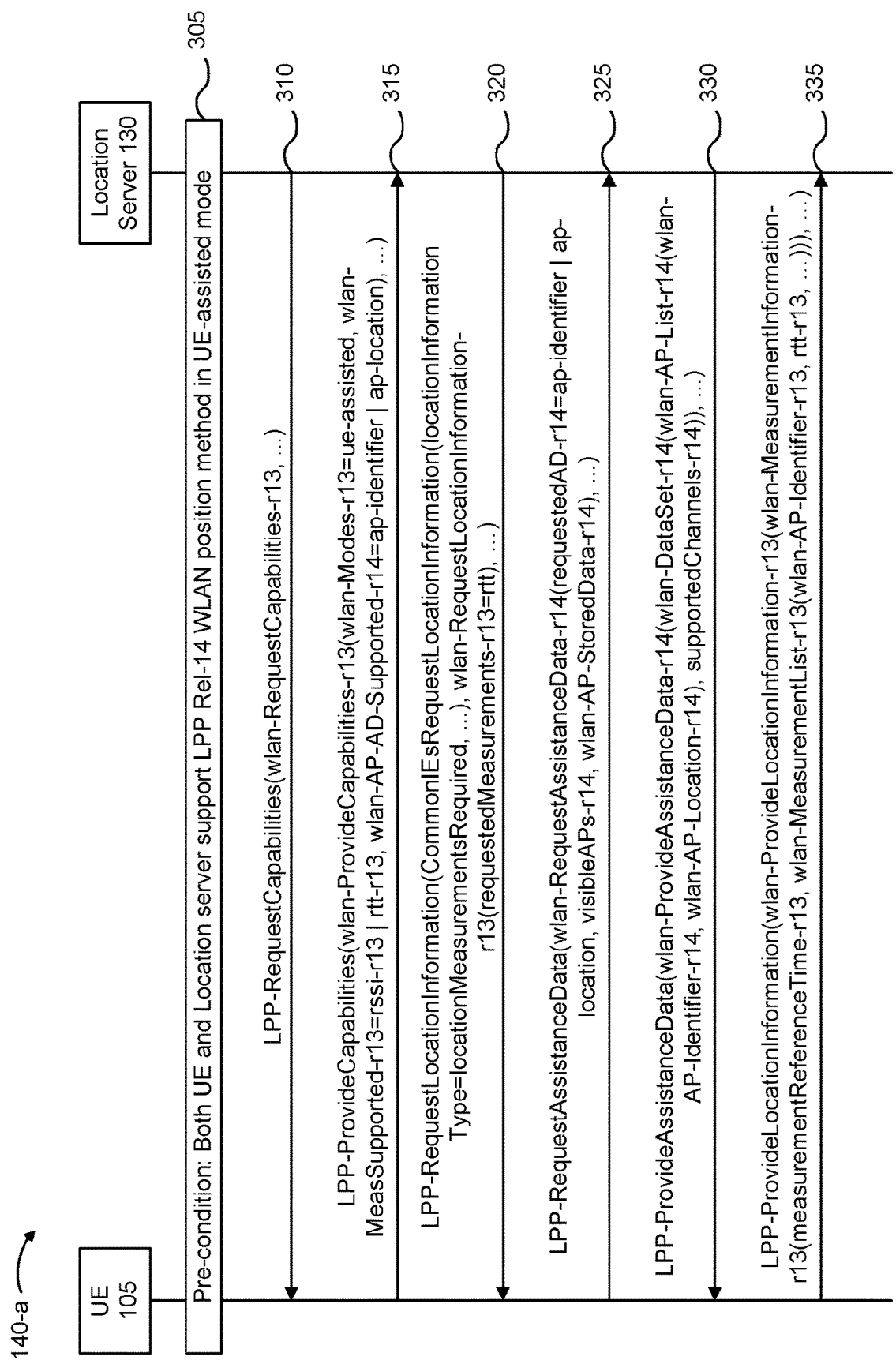
FIG. 3 is a ladder diagram illustrating an exemplary LPP session for WLAN FTM using the UE-assisted method with assistance data provision and RTT measurements reported to network.
Figure 4:
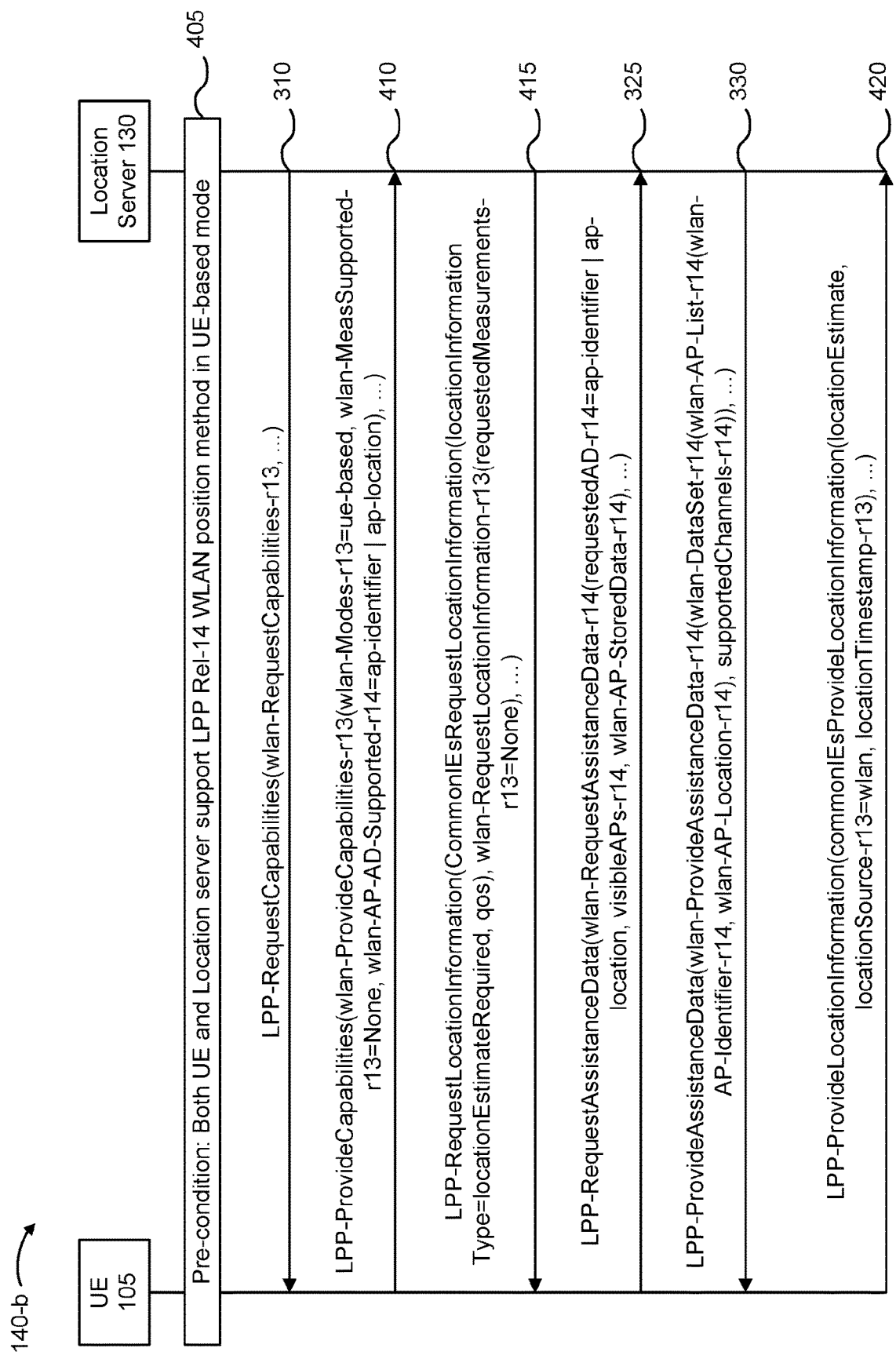
FIG. 4 is a ladder diagram illustrating an exemplary LPP session for WLAN FTM using the UE-based method with assistance data provision and UE's location reported to the network.
Figure 5:
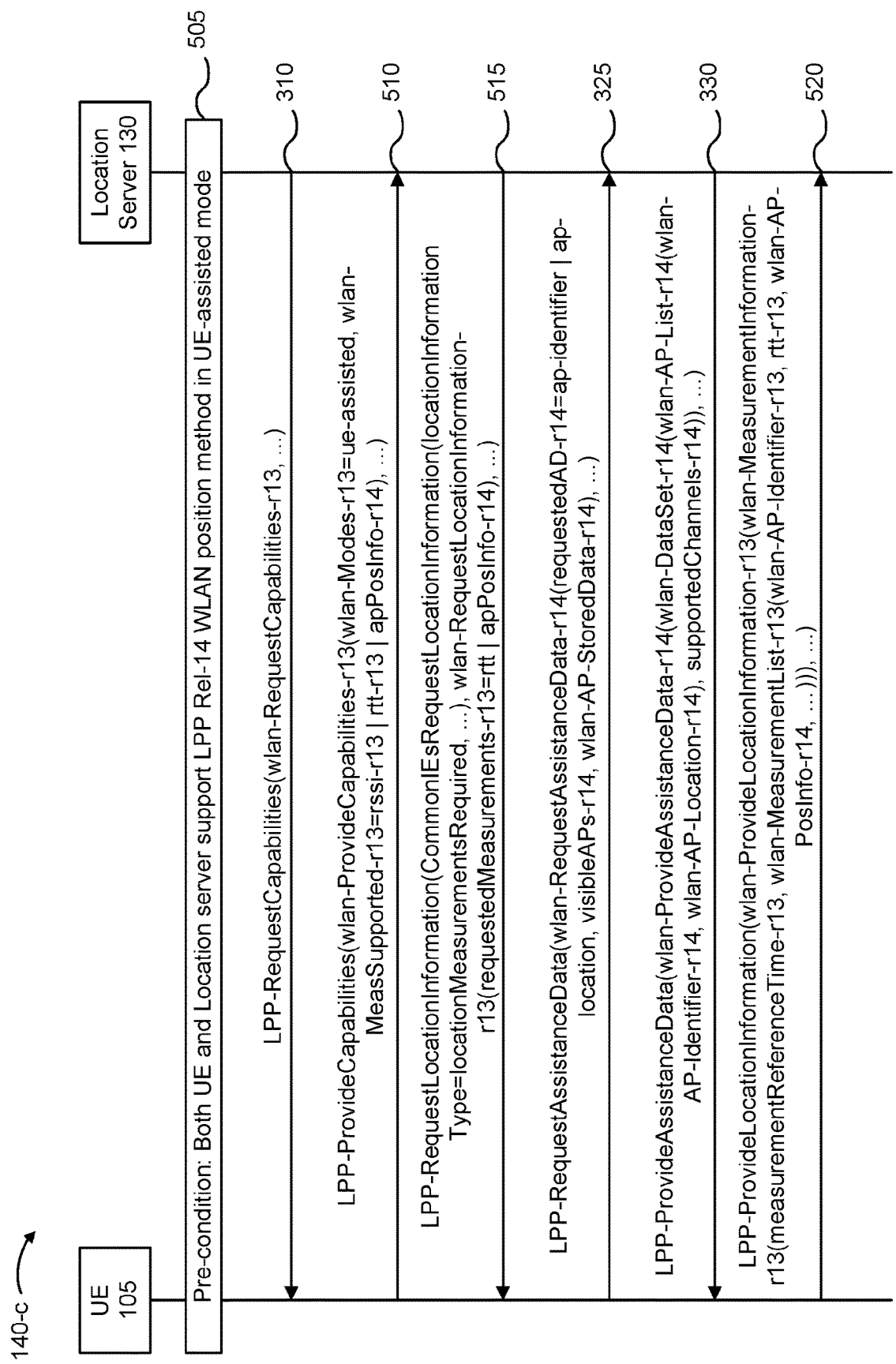
FIG. 5 is a ladder diagram illustrating an exemplary LPP session for WLAN FTM using the UE-assisted method with assistance data provision and AP location reported in the Measurements.

Depending upon the WLAN positioning mode that is being used (e.g., UE-assisted or UE-based) the UE 105 may send measurements or a location estimate to the location server 130 in an LPP-ProvideLocationInformation message. Examples of possible LPP sessions 140 are illustrated in FIGS. 3-5.

In response to receiving the FTM measurements (e.g., FTM RTT measurements) (from a UE 105 in the UE-assisted mode, for example) and performing a location determination algorithm at the location server 130 or in response to receiving a location estimate (from a UE 105 in the UE-based mode, for example) the location server 130 may send a response 230 to the MME 120. Upon receiving the response 230, the MME 120 may determine that the location has been determined. This determination may result in the generation of a location service response 235-c, which the MME 120 can provide to the entity that made the location service request 210. For example, the location service response 235-c may be for the MME 120 or the MME 120 may provide a location service response 235-a to the UE 105 and/or may provide a location service response 235-b to the outside entity 205.

It is appreciated that the LPP protocol defines several types of messages. These messages include request capabilities messages (e.g., LPP-RequestCapabilities( ) messages), provide capabilities messages (e.g., LPP-ProvideCapabilities( ) messages), request assistance data messages (e.g., LPP-RequestAssistanceData( ) messages), provide assistance data messages (e.g., LPP-ProvideAssistanceData( ) messages), request location information messages (e.g., LPP-RequestLocationInformation ( ) messages), and provide location information messages (e.g., LPP-ProvideLocationInformation ( ) messages). Each of these messages includes information elements (IEs) with each IE generally including one or more fields.

The present systems and methods are directed to enhancements to the LPP protocol. These enhancements include new and/or modified IEs and new and/or modified fields within those IEs. To help illustrate these enhancements, example Abstract Syntax Notation One (ASN1) code for various LPP messages and/IEs is provided herein. To help identify the enhancements, portions of the code have been bolded to highlight the enhancements.

To support the use of network assistance data the RequestAssistanceData IE and ProvideAssistanceData IE have to be enhanced with relevant information. This relevant information includes AP identifier information (also referred to herein as AP-list information) and/or the AP location information. The AP identifier information is used for the UE-assisted method and/or the UE-based method, and the AP location information is used for the UE-based method, discussed below. As it is likely that an operator (e.g., network operator) would like to control the time that the UE 105 may use such assistance information, the assistance information may be accompanied with purge time that defines how long the assistance information may be used.

Additionally, as a further optimization, the network may also provide WLAN channel numbers used by FTM-enabled APs, to assist the UE 105 in WLAN scanning (in order to save UE battery life, for example).

In order to support UE-based positioning in which the UE 105 reports its location, rather than RTT measurements, the assistance data 160 provided by the network also needs to include not only the list of APs, but also AP location. Additionally, LPP signaling needs to be enhanced so that the location server 130 may request UE-based positioning reporting.

In addition to assistance information, the present systems and methods provide enhancements to LPP signaling so that the UE 105 is able to report WLAN AP location information. The relevant information which may be broadcast by the AP may include: WLAN AP support for FTM, WLAN AP latitude and longitude, WLAN AP civic address, and/or WLAN AP floor number. This information can be reported to the location server 130 so that the assistance information may be collected and/or continuously updated.

As noted above, the assistance data 160 for WLAN positioning, UE-based WLAN positioning and AP location reporting are not supported in the Release-13 LPP protocol. Provided below are the detailed call flows for each of these enhancements, as well as Stage-3 details showing how the LPP protocol may be enhanced to support these enhancements.

FIG. 3 is a ladder diagram illustrating an exemplary LPP session 140-a for WLAN FTM using the UE-assisted method with Assistance Data provision and RTT measurements reported to the network. The LPP session 140-a may be an example of the LPP session 140 illustrated in FIGS. 1 and/or 2.

As set forth in 305, a pre-condition for the LPP session 140-a is that both the UE 105 and the location server 130 support the LPP Release-14 WLAN position method in UE-assisted mode.

At 310, the location server 130 sends an LPP-RequestCapabilities( ) message that includes a request for wlan-RequestCapabilities-r13.

At 315, the UE 105 sends an LPP-ProvideCapabilities( ) message that includes a wlan-ProvideCapabilities-r13 IE that includes fields for the wlan-Modes-r13 field (specifying ue-assisted, for example), wlan-MeasSupported-r13 field, and wlan-AP-AD-Supported-r14 field. With regard to the wlan-AP-AD-Supported-r14 field, the UE 105 can specify if it supports ap-identifier assistance data and/or ap-location assistance data. In one example, the wlan-AP-AD-Supported-r14 field is a bit stream.

At 320, the location server 130 sends an LPP-RequestLocationInformation( ) message that includes a CommonIEsRequestLocationInformation IE that includes a locationInformationType (that specifies locationMeasurementsRequired, in this case). The LPP-RequestLocationInformation( ) message also includes a wlan-requestLocationInformation-r13 IE that includes a requestedMeasurements-r13 field with the rtt option selected.

At 325, the UE 105 sends an LPP-RequestAssistanceData( ) message that includes a wlan-RequestAssistanceData-r14 IE that includes fields for requestedAD-r14, visibleAPs-r14, and wlan-AP-StoredData-r14. In some embodiments, the requestedAD-r14 field is a bit string that can specify a request for ap-identifier and/or ap-location information. In some embodiments, the visibleAPs-r14 field indicates to the location server 130 the currently visible APs. In some embodiments, the wlan-AP-StoredData-r14 field indicates to the location server 130 the identities of APs for which the UE 105 has stored assistance data received previously from the location server 130. In some cases, the wlan-AP-StoredData-r14 field is also referred to as a wlan-AP-Data-r14 field.

At 330, the location server 130 sends an LPP-ProvideAssistanceData( ) message that includes a wlan-ProvideAssistanceData-r14 IE that includes a sequence of wlan-DataSet-r14 IEs. In some embodiments, each wlan-DataSet-r14 IE includes a wlan-AP-List-r14 field that includes a sequence of wlan-AP-Data-r14 IEs that provides information for individual APs in the data set. The wlan-DataSet-r14 IE additionally includes fields (e.g., supportedChannels-11a-r14, supportedChannels-11bg-r14) that define the superset of all channels supported by all APs in the data set (of the different types: 802.11a (5 GHz) or 802.11b/802.11g (2.4 GHz)). Each wlan-AP-Data-r14 IE includes information for one AP. The wlan-AP-Data-r14 IE includes a wlan-AP-Identifier-r14 field (e.g., wlan-AP-ID-r14) and optionally a wlan-AP-Location-r14 field.

At 335, the UE 105 sends an LPP-ProvideLocationInformation( ) message that includes a wlan-ProvideLocationInformation-r13 IE. The wlan-ProvideLocationInformation-r13 IE includes an optional wlan-MeasurementInformation-r13 IE. The wlan-MeasurementInformation-r13 IE includes an optional measurementReferenceTime-r13 field and an optional wlan-MeasurementList-r13 field that specify a sequence of wlan-MeasurementElement-r13 IEs having a variety of optional fields. These optional fields include a wlan-AP-Identifier-r13 field and an rtt-r13 field.

As discussed above and as illustrated in FIG. 3, the RequestAssistanceData IE and the ProvideAssistanceData IE are enhanced with relevant information, which can be separated into two parts: AP identifier (e.g., AP list) and AP location. The former is used for the UE-assisted method and the latter (along with the former, for example) is used for the UE-based method, discussed below. As it is likely that the operator would like to control the time that the UE 105 may use such assistance information, it may be accompanied with purge time.

Additionally, as a further optimization, the location server 130 may also provide WLAN channel numbers used by FTM-enabled APs, to assist the UE 105 in WLAN scanning in order save UE battery life.

Stage-2 LPP enhancements to support the described systems and methods are illustrated in FIGS. 3-5. As used below the location server may be the location server 130 illustrated in FIGS. 1 and 2, and the target device may be the UE 105 illustrated in FIGS. 1 and 2. Stage-3 LPP enhancements to support the described systems and methods are provided in the form of ASN1 code. To help emphasize which portions of the code relate to the LPP enhancements, many of the enhancements have been marked in bold. Attention is also drawn to the "r14" designation (corresponding to Release-14 enhancements, for example) in the IE, field, and/or subfield names.

The RequestAssistanceData message body in an LPP message is used by the target device to request assistance data from the location server. As shown, a new wlan-RequestAssistanceData-r14 IE has been added to the RequestAssistanceData message body.

```
-- ASN1START
RequestAssistanceData ::=           SEQUENCE {
    criticalExtensions              CHOICE {
        c1                          CHOICE {
            requestAssistanceData-r9    RequestAssistanceData-r9-IEs,
            spare3 NULL, spare2 NULL, spare1 NULL
        },
        criticalExtensionsFuture    SEQUENCE { }
    }
}
RequestAssistanceData-r9-IEs ::= SEQUENCE {
    commonIEsRequestAssistanceData          CommonIEsRequestAssistanceData
        OPTIONAL,
```

```
           a-gnss-RequestAssistanceData           A-GNSS-RequestAssistanceData    OPTIONAL,
           otdoa-RequestAssistanceData            OTDOA-RequestAssistanceData
               OPTIONAL,
           epdu-RequestAssistanceData             EPDU-Sequence
               OPTIONAL,
           ...,
           [[ wlan-RequestAssistanceData-r14  WLAN-RequestAssistanceData-r14
               OPTIONAL
           ]]
}
-- ASN1STOP
```

The WLAN-RequestAssistanceData-r14 IE is used by the target device to request WLAN assistance data from a location server. The field descriptions for each of the fields in the WLAN-RequestAssistanceData-r14 IE are provided below.

```
-- ASN1START
WLAN-RequestAssistanceData-r14 ::= SEQUENCE {
     requestedAD-14        BIT STRING {  ap-list   (0),
                                         ap-location  (1)}(SIZE (1..16)),
     visibleAPs-r14        SEQUENCE (SIZE (1..maxVisibleAPs-r14))
                              OF WLAN-
          AP-ID-r14 OPTIONAL,
     wlan-AP-Data-r14      SEQUENCE (SIZE (1..maxKnownAPs-r14))
                              OF WLAN-
          AP-ID-r14   OPTIONAL,
     ...
}
maxVisibleAPs-r14         INTEGER ::= 32
maxKnownAPs-r14           INTEGER ::= 2048
-- ASN1STOP
```

WLAN AP identity information, also referred to as ap-list) and ap-location (include the location of each WLAN AP if available).

The visibleAPs field enables a target device to indicate to a location server the identities of up to 32 currently visible WLAN APs. This may assist a location server to provide assistance data for WLAN APs nearby to the target device. A target device shall provide visible APs in order of received signal strength with the AP with the highest signal strength provided first.

The wlan-AP-Data field enables a target device to indicate to a location server the identities of WLAN APs for which the target has assistance data received previously from this location server. This may enable a location server to avoid resending data for the same APs.

Turning now to the ProvideAssistanceData message body, the ProvideAssistanceData message body in an LPP message is used by the location server to provide assistance data to the target device either in response to a request from the target device or in an unsolicited manner. As shown, a new wlan-ProvideAssistanceData-r14 IE has been added to the ProvideAssistanceData message body.

```
-- ASN1START
ProvideAssistanceData ::= SEQUENCE {
     criticalExtensions                    CHOICE {
         c1                                CHOICE {
             provideAssistanceData-r9            ProvideAssistanceData-r9-IEs,
             spare3 NULL, spare2 NULL, spare1 NULL
         },
         criticalExtensionsFuture          SEQUENCE { }
     }
}
ProvideAssistanceData-r9-IEs ::= SEQUENCE {
     commonIEsProvideAssistanceData              CommonIEsProvideAssistanceData
         OPTIONAL,                        -- Need ON
     a-gnss-ProvideAssistanceData                A-GNSS-ProvideAssistanceData    OPTIONAL,
         -- Need ON
     otdoa-ProvideAssistanceData          OTDOA-ProvideAssistanceData
         OPTIONAL,                        -- Need ON
     epdu-Provide-Assistance-Data         EPDU-Sequence                           OPTIONAL,
         -- Need ON
     ...,
     [[ wlan-ProvideAssistanceData-r14           WLAN-ProvideAssistanceData-r14
         OPTIONAL                         -- Need ON
     ]]
}
-- ASN1STOP
```

The requestedAD field specifies the WLAN AP assistance data requested. This is represented by a bit string, with a one value at the bit position meaning that the particular assistance data is requested; and a zero value meaning that the particular assistance data is not requested. The following assistance data types are included: ap-identifier (include The WLAN-ProvideAssistanceData-r14 IE is used by the location server to provide assistance data to enable UE-based and UE-assisted WLAN positioning. It may also be used to provide WLAN positioning specific error reason. The field descriptions for each of the fields in the WLAN-ProvideAssistanceData-r14 IE are provided below.

```
-- ASN1START
WLAN-ProvideAssistanceData-r14 ::= SEQUENCE {
    wlan-DataSet-r14            SEQUENCE (SIZE
                                (1..maxWLAN-DataSets-r14))
        OF WLAN-DataSet-r14     OPTIONAL, -- Need ON
    wlan-Error-r14              WLAN-Error-r13 OPTIONAL,
                                -- Need
                                ON
    serverTracking-r14          NULL  OPTIONAL, --
                                Need ON
    ...
}
maxWLAN-DataSets-r14    INTEGER ::= 64
-- ASN1STOP
```

The wlan-DataSet-r14 IE provides data for up to 64 sets of WLAN APs. As shown, the wlan-DataSet-r14 field includes a sequence of WLAN-DataSet-r14 IEs (which are discussed below).

The wlan-Error field provides error information and may be included when a Provide Assistance Data is sent in response to a Request Assistance Data. It is allowed to include both a wlan-DataSet field and a wlan-Error field (e.g. when only some requested WLAN assistance data is provided).

The serverTracking field indicates whether the location server tracks WLAN assistance data sent to a target device. A target device need not indicate to a location server its possession of any assistance data received previously that is tracked when sending a Request Assistance Data for WLAN APs. Inclusion of the field indicates that the location server tracks data for WLAN APs and omission indicates the location server does not.

Each WLAN-DataSet-r14 IE, which is included in the wlan-DataSet-r14 IE, is used by the location server to provide WLAN AP information for one set of WLAN APs. The field descriptions for each of the fields in the WLAN-DataSet-r14 IE are provided below.

```
-- ASN1START
WLAN-DataSet-r14 ::= SEQUENCE {
    supportedChannels-11a-r14       SupportedChannels-11a-r14    OPTIONAL, --
        Need ON
    supportedChannels-11bg-r14      SupportedChannels-11bg-r14   OPTIONAL,
        -- Need ON
    wlan-AP-List-r14                SEQUENCE (SIZE (1..maxWLAN-AP-r14)) OF
        WLAN-AP-Data-r14,
    purgeTime-r14                   INTEGER (1..4096)            OPTIONAL, --
        Need ON
    ...
}
SupportedChannels-11a-r14 ::= SEQUENCE {
    ch34-r14                BOOLEAN,
    ch36-r14                BOOLEAN,
    ch38-r14                BOOLEAN,
    ch40-r14                BOOLEAN,
    ch42-r14                BOOLEAN,
    ch44-r14                BOOLEAN,
    ch46-r14                BOOLEAN,
    ch48-r14                BOOLEAN,
    ch52-r14                BOOLEAN,
    ch56-r14                BOOLEAN,
    ch60-r14                BOOLEAN,
    ch64-r14                BOOLEAN,
    ch149-r14               BOOLEAN,
    ch153-r14               BOOLEAN,
    ch157-r14               BOOLEAN,
    ch161-r14               BOOLEAN
}
SupportedChannels-11bg-r14 ::= SEQUENCE {
    ch1-r14                 BOOLEAN,
    ch2-r14                 BOOLEAN,
    ch3-r14                 BOOLEAN,
    ch4-r14                 BOOLEAN,
    ch5-r14                 BOOLEAN,
    ch6-r14                 BOOLEAN,
    ch7-r14                 BOOLEAN,
    ch8-r14                 BOOLEAN,
    ch9-r14                 BOOLEAN,
    ch10-r14                BOOLEAN,
    ch11-r14                BOOLEAN,
    ch12-r14                BOOLEAN,
    ch13-r14                BOOLEAN,
    ch14-r14                BOOLEAN
}
maxWLAN-AP-r14              INTEGER ::= 128
-- ASN1STOP
```

The supportedChannels-11a-r14 field defines the superset of all channels supported by all WLAN APs in the data set of type 801.11a (5 GHz band).

The supportedChannels-11bg-r14 field defines the superset of all channels supported by all WLAN APs in the data set of type 801.11b or 802.11g (2.4 GHz band).

The wlan-AP-List-r14 field provides information for one or more WLAN APs in the data set. The wlan-AP-List-r14 field includes a sequence of WLAN-AP-Data-r14 IEs (which are discussed below).

The purgeTime-r14 field provides a period after which all WLAN AP data provided in the WLAN-DataSet data type shall be purged from the target device. The period starts at receipt of the data and is defined in units of 15 minutes in the range 1 to 4096 (corresponding to just over 39 days).

The WLAN-AP-Data-r14 IE is used by the location server to provide information for one WLAN AP as part of WLAN AP assistance data. The field descriptions for each of the fields in the WLAN-AP-Data-r14 IE are provided below.

Configuration Protocol Options for Coordinate-Based Location Configuration Information," July 2011] and includes the following subfields:

The latitude Uncertainty-r14 subfield includes six bits that indicate the number of valid bits in the fixed-point value of latitude. In some embodiments, a value of zero is reserved to indicate that the uncertainty is unknown; and values greater than 34 are reserved. Its relation with the corresponding value in degrees is expressed with the following formula: latitudeUncertainty=8−ceil(log2(uncertainty in degrees)).

The latitude-r14 subfield includes a 34-bit fixed point value consisting of nine bits of integer and 25 bits of fraction indicating the latitude (+/−90 degrees) of the AP.

The longitude Uncertainty-r14 subfield includes six bits that indicate the number of valid bits in the fixed-point value of longitude. In some embodiments, a value of zero is reserved to indicate that the uncertainty is unknown; and values greater than 34 are reserved. Its relation with the

```
-- ASN1START
WLAN-AP-Data-r14 ::= SEQUENCE {
        wlan-AP-ID-r14                  WLAN-AP-ID-r14,
     wlan-AP-Location-r14               WLAN-AP-Location-r14                    OPTIONAL, --
            Need ON
        supportedChannels-r14   SEQUENCE (SIZE (1..maxWLAN-AP-Channels-r14))
            OF WLAN-AP-Channel-Bandwidth-r14            OPTIONAL, -- Need ON
        supportsFTM-r14         BOOLEAN                                 OPTIONAL, --
            Need ON
        ...
}
WLAN-AP-ID-r14 ::= SEQUENCE {
        wlan-AP-MacAddress-r14                  BIT STRING (SIZE (48)),
        ...
}
WLAN-AP-Location-r14 ::= SEQUENCE {
        locationDataLCI-r14                     LocationDataLCI-r14,
        locationDataZ-r14                   LocationDataZ-r14               OPTIONAL,
        locationExpectedToMove-r14              INTEGER (0..3)                          OPTIONAL,
        ...
}
LocationDataLCI-r14 ::= SEQUENCE {
        latitudeUncertainty-r14         BIT STRING (SIZE (6)),
        latitude-r14                    BIT STRING (SIZE (34)),
        longitudeUncertainty-r14        BIT STRING (SIZE (6)),
        longitude-r14                   BIT STRING (SIZE (34)),
        altitudeUncertainty-r14         BIT STRING (SIZE (6)),
        altitude-r14                    BIT STRING (SIZE (30)),
        datum-r14                        BIT STRING (SIZE (8)),
        ...
}
LocationDataZ-r14 ::= SEQUENCE {
    floorNumber-r14                             INTEGER (-8192..8191),
        heightAboveFloor-r14                    INTEGER (-8388608..8388607)             OPTIONAL,
        heightAboveFloorUncertainty-r14         INTEGER (0..31)                 OPTIONAL
}
WLAN-AP-Channel-Bandwidth-r14 ::= SEQUENCE {
    controlChannelFrequency-r14             INTEGER (0..256),
        rf-Bandwidth-r14                BIT STRING {    bw20mhz         (0),
                                        bw40mhz (1),
                                          bw80mhz (2),
                                          bw160mhz              (3)} (SIZE (1..16))
}
maxWLAN-AP-Channels-r14         INTEGER ::= 8
-- ASN1STOP
```

The wlan-AP-ID-r14 (e.g., wlan-AP-Identifier-r14) field provides the 48-bit MAC address of the WLAN AP.

The wlan-AP-Location-r14 field includes a WLAN-AP-Location-r14 IE that provides a LocationDataLCI-r14 field. The LocationDataLCI-r14 field provides the location of the WLAN AP in the form of Location Configuration Information (LCI) defined in [Internet Engineering Task Force (IETF) Request for Comments (RFC) 6225, "Dynamic Host corresponding value in degrees is expressed with the following formula: longitudeUncertainty=8−ceil(log2(uncertainty in degrees)).

The longitude-r14 subfield includes a 34-bit fixed point value consisting of nine bits of integer and 25 bits of fraction indicating the longitude (+/−180 degrees) of the AP.

The altitude Uncertainty-r14 subfield includes six bits that indicate the number of valid bits in the altitude. In some embodiments, a value of zero is reserved to indicate that the uncertainty is unknown; and values greater than 30 are reserved. Its relation with the corresponding value in meters is expressed with the following formula: altitudeUncertainty=21−ceil(log2(uncertainty in meters)).

The altitude-r14 subfield includes a 30-bit fixed point value consisting of 22 bits of integer and eight bits of fraction indicating the altitude of the AP.

The datum-r14 subfield includes three bits that indicate the map datum used for the coordinates. Defined codes are: 1: World Geodetic System 1984 (WGS-84), 2: North American Datum 1983 (NAD-83) with North American Vertical Datum 1988 (NAVD-88), and 3: North American Datum 1983 (NAD-83) with Mean Lower Low Water (MLLW) vertical datum.

The locationDataZ-r14 field provides the Z location of the AP in the form of Location Data Z defined in [IETF RFC 6225, "Dynamic Host Configuration Protocol Options for Coordinate-Based Location Configuration Information," July 2011] and includes the following subfields: floorNumber-r14 (indicates the floor number of the AP), heightAboveFloor-r14 (indicates the height of the AP from the floor), and heightAboveFloorUncertainty-r14 (uncertainty for heightAboveFloor).

The locationExpectedToMove-r14 field indicates whether the AP is expected to change its location. The value one indicates that the AP is expected to change its location. The value zero indicates that the AP is not expected to change its location. The value two indicates that the AP's movement patterns are unknown.

The supportedChannels-r14 field provides information about the channels and bandwidths supported by the WLAN AP.

The supportsFTM-r14 field provides information whether the WLAN AP supports FTM.

Turning now to the WLAN-ProvideCapabilities IE, the WLAN-ProvideCapabilities IE is used by the target device to provide its capabilities for WLAN positioning to the location server. As shown, a new wlan-AP-AD-Supported-r14 field has been added to the WLAN-ProvideCapabilities IE. The field descriptions for each of the fields in the WLAN-ProvideCapabilities IE are provided below.

is supported; and a zero value meaning that the particular measurement is not supported. A zero value in all bit positions in the bit string means that only the basic WLAN positioning method is supported by the target device which is reporting the WLAN identity. The following bits are assigned for the indicated measurements: rssi (the AP signal strength at the target device) and rtt (the Round Trip Time between the target device and the AP).

The wlan-AP-AD-Supported-r14 field specifies the WLAN AP assistance data supported by the target device. This is represented by a bit string, with a one value at the bit position meaning that the particular assistance data is supported; and a zero value meaning that the particular assistance data is not supported. A zero value in all bit positions or absence of this field means that no assistance data is supported. The following bits are assigned for the indicated assistance data: ap-identifier (list of WLAN APs, also referred to as ap-list) and ap-location (location of each WLAN AP in the list of WLAN APs).

FIG. 4 is a ladder diagram illustrating an exemplary LPP session 140-*b* for WLAN FTM using the UE-based method with Assistance Data provision and UE's location reported to the network. The LPP session 140-*b* may be an example of the LPP session 140 illustrated in FIGS. 1 and/or 2.

As set forth in 405, a pre-condition for the LPP session 140-*b* is that both the UE 105 and the location server 130 support the LPP Release-14 WLAN position method in UE-based mode.

At 310, the location server 130 sends an LPP-RequestCapabilities( ) message that includes a request for wlan-RequestCapabilities-r13.

At 410, the UE 105 sends an LPP-ProvideCapabilities( ) message that includes a wlan-ProvideCapabilities-r13 IE that includes fields for the wlan-Modes-r13 field (specifying ue-based, for example), wlan-MeasSupported-r13 field, and wlan-AP-AD-Supported-r14 field. With regard to the wlan-AP-AD-Supported-r14 field, the UE 105 can specify if it supports ap-identifier assistance data and/or ap-location assistance data. In one example, the wlan-AP-AD-Supported-r14 field is a bit stream.

At 415, the location server 130 sends an LPP-RequestLocationInformation( ) message that includes a Com-

```
-- ASN1START
WLAN-ProvideCapabilities-r13 ::= SEQUENCE {
     wlan-Modes-r13           BIT STRING  {   standalone        (0),
                                              ue-assisted       (1)}   (SIZE (1..8)),
     wlan-MeasSupported-r13   BIT STRING  {
                                              rssi-r13          (0),
                                              rtt-r13           (1)}   (SIZE(1..8)),
     ...,
     [[ wlan-AP-AD-Supported-r14 BIT STRING {       ap-list           (0),
                                                    ap-location       (1)}  (SIZE
(1..16))
     ]]
}
-- ASN1STOP
```

The wlan-Modes-r13 field specifies the WLAN mode(s) supported by the target device. This is represented by a bit string, with a one value at the bit position meaning the WLAN mode (e.g., standalone, UE-assisted, UE-based) is supported; and a zero value meaning the WLAN mode is not supported.

The wlan-MeasSupported-r13 field specifies the measurements supported by the target device when accessing a WLAN. This is represented by a bit string, with a one value at the bit position meaning that the particular measurement monIEsRequestLocationInformation that includes a locationInformationType (that specifies locationEstimateRequired, in this case). The LPP-RequestLocationInformation( ) message also includes a wlan-RequestLocationInformation-r13 IE that includes a requestedMeasurements-r13 field with the none option selected.

At 325, the UE 105 sends an LPP-RequestAssistanceData( ) message that includes a wlan-RequestAssistanceData-r14 IE that includes fields for requestedAD-r14, visibleAPs-r14, and wlan-AP-StoredData-r14. In some embodiments, the requestedAD-r14 field is a bit string that can specify a request for ap-identifier and/or ap-location information. In some embodiments, the visibleAPs-r14 field indicates to the location server 130 the currently visible APs. In some embodiments, the wlan-AP-StoredData-r14 field indicates to the location server 130 the identities of APs for which the UE 105 has stored assistance data received previously from the location server 130. In some cases, the wlan-AP-StoredData-r14 field is also referred to as a wlan-AP-Data-r14 field.

At 330, the location server 130 sends an LPP-ProvideAssistanceData( ) message that includes a wlan-ProvideAssistanceData-r14 IE that includes a sequence of wlan-DataSet-r14 IEs. In some embodiments, each wlan-DataSet-r14 IE includes a wlan-AP-List-r14 field that includes a sequence of wlan-AP-Data-r14 IEs that provides information for individual APs in the data set. The wlan-DataSet-r14 IE additionally includes fields (e.g., supportedChannels-11a-r14, supportedChannels-11bg-r14) that define the superset of all channels supported by all APs in the data set (of the different types: 802.11a (5 GHz) or 802.11b/802.11g (2.4 GHz)). Each wlan-AP-Data-r14 IE includes information for one AP. The wlan-AP-Data-r14 IE includes a wlan-AP-Identifier-r14 field (e.g., wlan-AP-ID-r14) and optionally a wlan-AP-Location-r14 field.

At 420, the UE 105 sends an LPP-ProvideLocationInformation( ) message that includes a CommonIEsProvideLocationInformation IE that specifies a locationEstimate, a locationSource-r13 (that specifies wlan, in this case), and a locationTimestamp-r13.

In addition to the foregoing, the described systems and methods also describe Stage-3 LPP protocol enhancements to support UE-based positioning. These are described below.

The WLAN-RequestLocationInformation-r13 IE and the WLAN-RequestLocationInformation-r14 IE are used by the location server to request WLAN measurements from a target device. The field descriptions for each of the fields in the WLAN-RequestLocationInformation-r13 IE and the WLAN-RequestLocationInformation-r14 IE are provided below.

```
-- ASN1START
WLAN-RequestLocationInformation-r13 ::= SEQUENCE {
    requestedMeasurements-r13   BIT STRING {
                                    rssi  (0),
                                    rtt   (1)} (SIZE(1..8)),
    ...
}
WLAN-RequestLocationInformation-r14 ::= SEQUENCE {
    requestedMeasurements-r14   BIT STRING {
                                    rssi  (0),
                                    rtt   (1)}
                                (SIZE(1..8))  OPTIONAL,
    ...,
    [[ wlanMethods-r14          BIT STRING {
                                    rssi  (0),
                                    rtt   (1)}
                                (SIZE(1..8))  OPTIONAL
    ]]
}
-- ASN1STOP
```

The requestedMeasurements-r13 and requestedMeasurements-r14 fields specify the WLAN measurements requested. This is represented by a bit string, with a one value at the bit position meaning the particular measurement is requested; and a zero value meaning the particular measurement is not requested. The following measurement requests can be included: rssi (AP signal strength at the target device) and rtt (Round Trip Time between the target device and the AP).

The wlanMethods-r14 field indicates the WLAN positioning methods allowed by the location server for the UE to compute a location estimate. This is represented by a bit string, with a one value at the bit position meaning that the particular method is allowed; and a zero-value meaning that the particular method is not allowed. The following methods can be included: rssi (AP signal strength at the target device) and rtt (Round Trip Time between the target device and the AP).

AP location reporting is illustrated in the call flow illustrated in FIG. 5. FIG. 5 is a ladder diagram illustrating an exemplary LPP session 140-c for WLAN FTM using the UE-assisted method with Assistance Data provision and AP location reported in the measurements. The LPP session 140-c may be an example of the LPP session 140 illustrated in FIGS. 1 and/or 2.

As set forth in 505, a pre-condition for the LPP session 140-c is that both the UE 105 and the location server 130 support the LPP Release-14 WLAN position method in UE-assisted mode.

At 310, the location server 130 sends an LPP-RequestCapabilities( ) message that includes a request for wlan-RequestCapabilities-r13.

At 510, the UE 105 sends an LPP-ProvideCapabilities( ) message that includes a wlan-ProvideCapabilities-r13 IE that includes fields for the wlan-Modes-r13 field (specifying ue-assisted, for example) and the wlan-MeasSupported-r13 field. In some embodiments, the wlan-MeasSupported-r13 field is a bit string that indicates one or more of rssi-r13, rtt-r13, and/or apPosInfo-r14, where a one value indicates that a particular measure is supported and a zero value indicates that the particular measure is not supported.

At 515, the location server 130 sends an LPP-RequestLocationInformation( ) message that includes a CommonIEsRequestLocationInformation that includes a locationInformationType (that specifies locationMeasurementsRequired, in this case). The LPP-RequestLocationInformation( ) message also includes a wlan-RequestLocationInformation-r13 IE that includes a requestedMeasurements-r13 field with the rtt and apPosInfo-r14 options selected.

At 325, the UE 105 sends an LPP-RequestAssistanceData( ) message that includes a wlan-RequestAssistanceData-r14 IE that includes fields for requestedAD-r14, visibleAPs-r14, and wlan-AP-StoredData-r14. In some embodiments, the requestedAD-r14 field is a bit string that can specify a request for ap-identifier and/or ap-location information. In some embodiments, the visibleAPs-r14 field indicates to the location server 130 the currently visible APs. In some embodiments, the wlan-AP-StoredData-r14 field indicates to the location server 130 the identities of APs for which the UE 105 has stored assistance data received previously from the location server 130. In some cases, the wlan-AP-StoredData-r14 field is also referred to as a wlan-AP-Data-r14 field.

At 330, the location server 130 sends an LPP-ProvideAssistanceData( ) message that includes a wlan-ProvideAssistanceData-r14 IE that includes a sequence of wlan-DataSet-r14 IEs. In some embodiments, each wlan-DataSet-r14 IE includes a wlan-AP-List-r14 field that includes a sequence of wlan-AP-Data-r14 IEs that provide information for individual APs in the data set. The wlan-DataSet-r14 IE additionally includes fields (e.g., supportedChannels-11a-r14, supportedChannels-11bg-r14) that define the superset of all channels supported by all APs in the data set (of the different types: 802.11a (5 GHz) or 802.11b/802.11g (2.4 GHz)). Each wlan-AP-Data-r14 IE includes information for one AP. The wlan-AP-Data-r14 IE includes a wlan-AP-Identifier-r14 field (e.g., wlan-AP-ID-r14) and optionally a wlan-AP-Location-r14 field.

At 520, the UE 105 sends an LPP-ProvideLocationInformation( ) message that includes a wlan-ProvideLocationInformation-r13 IE. The wlan-ProvideLocationInformation-r13 IE includes a wlan-MeasurementInformation-r13 IE. The wlan-MeasurementInformation-r13 IE includes fields that include a measurementReferenceTime-r13 field and a wlan-MeasurementList-r13 field. The wlan-MeasurementList-r13 field includes subfields for wlan-AP-Identifier-r13, rtt-r13, and wlan-AP-PosInfo-r14 subfields.

In this procedure, the UE reports the following information to the location server: WLAN AP support for FTM, WLAN AP latitude and longitude, WLAN AP civic address, and WLAN AP floor number. Below are the Stage-3 enhancements for the LPP protocol to support this functionality.

The WLAN-MeasurementInformation-r13 IE is provided below. The field descriptions for fields of the WLAN-MeasurementInformation-r13 IE are provided below.

```
-- ASN1START
WLAN-MeasurementInformation-r13 ::= SEQUENCE {
        measurementReferenceTime-r13            UTCTime                                 OPTIONAL,
        wlan-MeasurementList-r13                WLAN-MeasurementList-r13                OPTIONAL,
        ...
}
WLAN-MeasurementList-r13 ::= SEQUENCE (SIZE(1..maxWLAN-AP-r13)) OF WLAN-
                MeasurementElement-r13
WLAN-MeasurementElement-r13 ::= SEQUENCE {
        wlan-AP-Identifier-r13          WLAN-AP-Identifier-r13,
        rssi-r13                                INTEGER (-127..128)             OPTIONAL,
        rtt-r13                         WLAN-RTT-r13                                    OPTIONAL,
        apChannelFrequency-r13                  INTEGER (0..256)                        OPTIONAL,
        servingFlag-r13                 BOOLEAN                                 OPTIONAL,
        ...,
        [[      wlan-AP-PosInfo-r14     WLAN-AP-PositioningInformation-r14              OPTIONAL
        ]]
}
WLAN-AP-Identifier-r13 ::= SEQUENCE {
        bssid-r13                               OCTET STRING (SIZE (6)),
        ssid-r13                                OCTET STRING (SIZE (1..32))             OPTIONAL,
        ...
}
WLAN-RTT-r13 ::= SEQUENCE {
        rttValue-r13    INTEGER (0..16777215),
        rttUnits-r13    ENUMERATED {            microseconds,
                                                hundredsofnanoseconds,
                                                tensofnanoseconds,
                                                nanoseconds,
                                                tenthsofnanoseconds,
                                                ... },
        rttAccuracy-r13 INTEGER (0..255)                                                OPTIONAL,
        ...
}
WLAN-AP-PositioningInformation-r14 ::= SEQUENCE {
        locationDataLCI-r14                     LocationDataLCI-r14                     OPTIONAL,
        locationDataZ-r14                       LocationDataZ-r14               OPTIONAL,
        locationExpectedToMove-r14              INTEGER (0..3)                                  OPTIONAL,
        civicLocation-r14                       CivicLocation-r14                       OPTIONAL,
        relativeAccuracy-r14                    RelativeAccuracy-r14                    OPTIONAL,
        supportsFTM-r14                 BOOLEAN                                 OPTIONAL,
        ...
}
LocationDataLCI-r14 ::= SEQUENCE {
        latitudeUncertainty-r14                 BIT STRING (SIZE (6)),
        latitude-r14                            BIT STRING (SIZE (34)),
        longitudeUncertainty-r14                BIT STRING (SIZE (6)),
        longitude-r14                           BIT STRING (SIZE (34)),
        altitudeUncertainty-r14                 BIT STRING (SIZE (6)),
        altitude-r14                            BIT STRING (SIZE (30)),
        datum-r14                                       BIT STRING (SIZE (8)),
        ...
}
LocationDataZ-r14 ::= SEQUENCE {
        floorNumber-r14                                 INTEGER (-8192..8191),
        heightAboveFloor-r14                            INTEGER (-8388608..8388607)             OPTIONAL,
        heightAboveFloorUncertainty-r14                 INTEGER (0..31)                         OPTIONAL
}
CivicLocation-r14 ::= SEQUENCE {
        countryCode-r14                         OCTET STRING (SIZE (2)),
        civicAddressElementList-r14             CivicAddressElementList-r14,
        ...
}
CivicAddressElementList-r14 ::= SEQUENCE (SIZE (1..128)) OF
CivicAddressElement-r14
```

```
CivicAddressElement-r14 ::= SEQUENCE {
    caType-r14                  INTEGER(0..511),
    caValue-r14                     OCTET STRING (SIZE (1..256)),
    ...
}
RelativeAccuracy-r14 ::= SEQUENCE {
  referenceAP-r14               WLAN-AP-ID-r14,
  horizontalError-r14           INTEGER (0..15),
  verticalError-r14             INTEGER (0..15)
}
maxWLAN-AP-r13                  INTEGER ::= 64
-- ASN1STOP
```

The measurementReferenceTime-r13 field provides the UTC time when the WLAN measurements are performed and should take the form of YYMMDDhhmmssZ.

The wlan-MeasurementList-r13 field provides the WLAN measurements for up to 64 WLAN APs.

The wlan-AP-Identifier-r13 field provides the BSSID and optionally the SSID of the wireless network served by the WLAN AP.

The rssi-r13 field provides the AP signal strength (RSSI) of a beacon frame, probe response frame or measurement pilot frame measured at the target in dBm.

The rtt-r13 field provides the measured Round Trip Time between the target device and WLAN AP and optionally the accuracy expressed as the standard deviation of the delay. Units for each of these are 1000 ns, 100 ns, 10 ns, 1 ns, and 0.1 ns.

The apChannelFrequency-r13 field provides the AP channel number identification of the reported WLAN AP.

The servingFlag-r13 parameter indicates whether a set of WLAN AP measurements were obtained for a serving WLAN AP (TRUE) or a non-serving WLAN AP (FALSE). A target device with multiple radio support may indicate more than one type of serving access for the same time instant.

The rttValue-r13 field specifies the Round Trip Time (RTT) measurement between the target device and WLAN AP in units given by the field rttUnits.

The rttUnits-r13 field specifies the Units for the fields rttValue and rttAccuracy. The available Units are 1000 ns, 100 ns, 10 ns, 1 ns, and 0.1 ns.

The rttAccuracy-r13 field provides the estimated accuracy of the provided rttValue expressed as the standard deviation in units given by the field rttUnits.

The wlan-AP-PosInfo-r14 field provides the WLAN AP positioning information as advertised by the AP.

The locationDataLCI-r14 field provides the location of the WLAN AP in the form of Location Configuration Information (LCI) defined in [IETF RFC 6225, "Dynamic Host Configuration Protocol Options for Coordinate-Based Location Configuration Information," July 2011] and includes the following subfields.

The latitudeUncertainty-r14 subfield is six bits that indicate the number of valid bits in the fixed-point value of latitude. In some cases, a value of zero is reserved to indicate that the uncertainty is unknown; values greater than 34 are reserved. Its relation with the corresponding value in degrees is expressed with the following formula: latitudeUncertainty=8−ceil(log2(uncertainty in degrees)).

The latitude-r14 subfield is a 34-bit fixed point value consisting of nine bits of integer and 25 bits of fraction indicating the Latitude (+/−90 degrees) of the AP.

The longitudeUncertainty-r14 subfield is six bits that indicate the number of valid bits in the fixed-point value of longitude. In some cases, a value of zero is reserved to indicate that the uncertainty is unknown; values greater than 34 are reserved. Its relation with the corresponding value in degrees is expressed with the following formula: longitudeUncertainty=8−ceil(log2(uncertainty in degrees)).

The longitude-r14 subfield is a 34-bit fixed-point value consisting of nine bits of integer and 25 bits of fraction indicating the Longitude (+/−180 degrees) of the AP.

The altitudeUncertainty-r14 subfield is six bits that indicate the number of valid bits in the altitude. In some cases, a value of zero is reserved to indicate that the uncertainty is unknown; values greater than 30 are reserved. Its relation with the corresponding value in meters is expressed with the following formula: altitudeUncertainty=21−ceil(log2(uncertainty in meters)).

The altitude-r14 subfield is a 30-bit fixed point value consisting of 22 bits of integer and eight bits of fraction indicating the altitude of the AP.

The datum-r14 subfield is three bits indicating the map datum used for the coordinates. Defined codes are: 1: World Geodetic System 1984 (WGS-84), 2: North American Datum 1983 (NAD-83) with North American Vertical Datum 1988 (NAVD-88), 3: North American Datum 1983 (NAD-83) with Mean Lower Low Water (MLLW) vertical datum.

The locationDataZ-r14 field provides the Z location of the AP in the form of Location Data Z defined in [IETF RFC 6225, "Dynamic Host Configuration Protocol Options for Coordinate-Based Location Configuration Information," July 2011] and includes the following subfields.

The floorNumber-r14 subfield indicates the floor number of the AP.

The heightAboveFloor-r14 subfield indicates the height of the AP from the floor.

The heightAboveFloorUncertainty-r14 subfield indicates the uncertainty for heightAboveFloor.

The locationExpectedToMove-r14 field indicates whether the AP is expected to change its location. The value 1 indicates that the AP is expected to change its location. The value zero indicates that the AP is not expected to change its location. The value 2 indicates that the AP's movement patterns are unknown.

The civicLocation-r14 field provides a civic location based on [IETF RFC 4776, "Dynamic Host Configuration Protocol (DHCPv4 and DHCPv6) Option for Civic Addresses Configuration Information," November 2006] and includes the following subfields.

The countryCode-r14 subfield parameter provides the two-letter ISO 3166 country code in capital ASCII letters (e.g., DE or US).

The caType-r14 subfield defines the civic address type as defined in [IETF RFC 4776, "Dynamic Host Configuration Protocol (DHCPv4 and DHCPv6) Option for Civic Addresses Configuration Information," November 2006].

The caValue-r14 subfield defines the civic address value, as described in [IETF RFC 4776, "Dynamic Host Configuration Protocol (DHCPv4 and DHCPv6) Option for Civic Addresses Configuration Information," November 2006]. As defined in [IETF RFC 4776, "Dynamic Host Configuration Protocol (DHCPv4 and DHCPv6) Option for Civic Addresses Configuration Information," November 2006], this field shall be encoded as UTF-8 and may employ mixed case.

Turning now to the WLAN-RequestLocationInformation-r13 IE, the WLAN-RequestLocationInformation-r13 IE is used by the location server to request WLAN measurements from a target device. The field descriptions for fields of the WLAN-RequestLocationInformation-r13 IE are provided below.

```
-- ASN1START
WLAN-RequestLocationInformation-r13 ::= SEQUENCE {
    requestedMeasurements-r13 BIT STRING {
                              rssi       (0),
                              rtt        (1),
                              apPosInfo  (2)} (SIZE(1..8)),
    ...
}
-- ASN1STOP
```

The requestedMeasurements-r13 field specifies the WLAN measurements requested. This is represented by a bit string, with a one value at the bit position meaning that the particular measurement is requested and a zero-value at the bit position meaning that the particular measurement is not requested. The following measurement requests can be included: rssi (the AP signal strength at the target device), rtt (the Round Trip Time between target device and the AP), and apPosInfo (AP related information, e.g., location, civic address, etc., as advertised by the AP).

Turning now to the WLAN-ProvideCapabilities-r13 IE, the WLAN-ProvideCapabilities-r13 IE is used by the target device to provide its capabilities for WLAN positioning to the location server. The field descriptions for fields of the WLAN-ProvideCapabilities-r13 IE are provided below.

```
-- ASN1START
WLAN-ProvideCapabilities-r13 ::= SEQUENCE {
    wlan-Modes-r13           BIT STRING { standalone  (0),
                                          ue-assisted (1)}  (SIZE (1..8)),
    wlan-MeasSupported-r13   BIT STRING {
                              rssi-r13     (0),
                              rtt-r13      (1),
                              apPosInfo-r14 (2)} (SIZE(1..8)),
    ...
}
-- ASN1STOP
```

The wlan-Modes-r13 field specifies the WLAN mode(s) supported by the target device. This is represented by a bit string, with a one-value at the bit position meaning that the WLAN mode is supported and a zero-value at the bit position meaning that the WLAN mode is not supported.

The wlan-MeasSupported-r13 field specifies the measurements supported by the target device when accessing a WLAN. This is represented by a bit string, with a one value at the bit position meaning that the particular measurement is supported and a zero-value at the bit position meaning that the particular measurement is not supported. A zero-value in all the bit positions in the bit string means only the basic WLAN positioning method is supported by the target device which is reporting of the WLAN identity. The following bits are assigned for the indicated measurements: rssi (the AP signal strength at the target device), rtt (the Round Trip Time between the target device and the AP), and apPosInfo (the AP related information, e.g., location, civic address, etc., as advertised by the AP).

Figure 6:
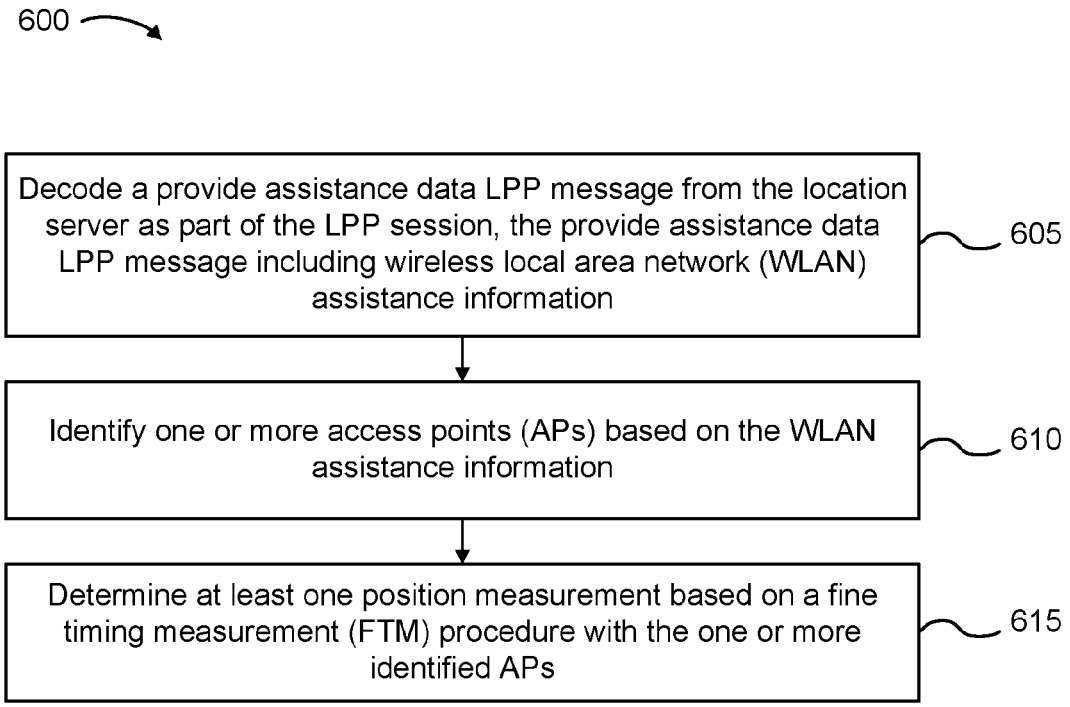
FIG. 6 is a flow diagram of a method for performing WLAN FTM.

FIG. 6 is a flow diagram of a method 600 for performing WLAN FTM. The method 600 is performed by a device, such as a user equipment (UE) or the like. In particular, the method 600 may be performed by a processor (e.g., a baseband processor) within the device. Although the operations of method 600 are illustrated as being performed in a particular order, it is understood that the operations of method 600 may be reordered without departing from the scope of the method.

At 605, a provide assistance data LPP message from the location server is decoded as part of the LPP session. The provide assistance data LPP message includes WLAN assistance information (e.g., ap-identifier and/or ap-location information). At 610, one or more access points (APs) are identified based on the WLAN assistance information. For example, BSSIDs from the assistance information may be compared with the BSSIDs of visible APs so that accessible and capable APs can quickly and efficiently be identified. At 615, at least one position measurement is determined based on a fine timing measurement (FTM) procedure with the one or more identified APs.

The operations of method 600 may be performed by an application specific processor, programmable application specific integrated circuit (ASIC), field programmable gate array (FPGA), or the like.

Figure 7:
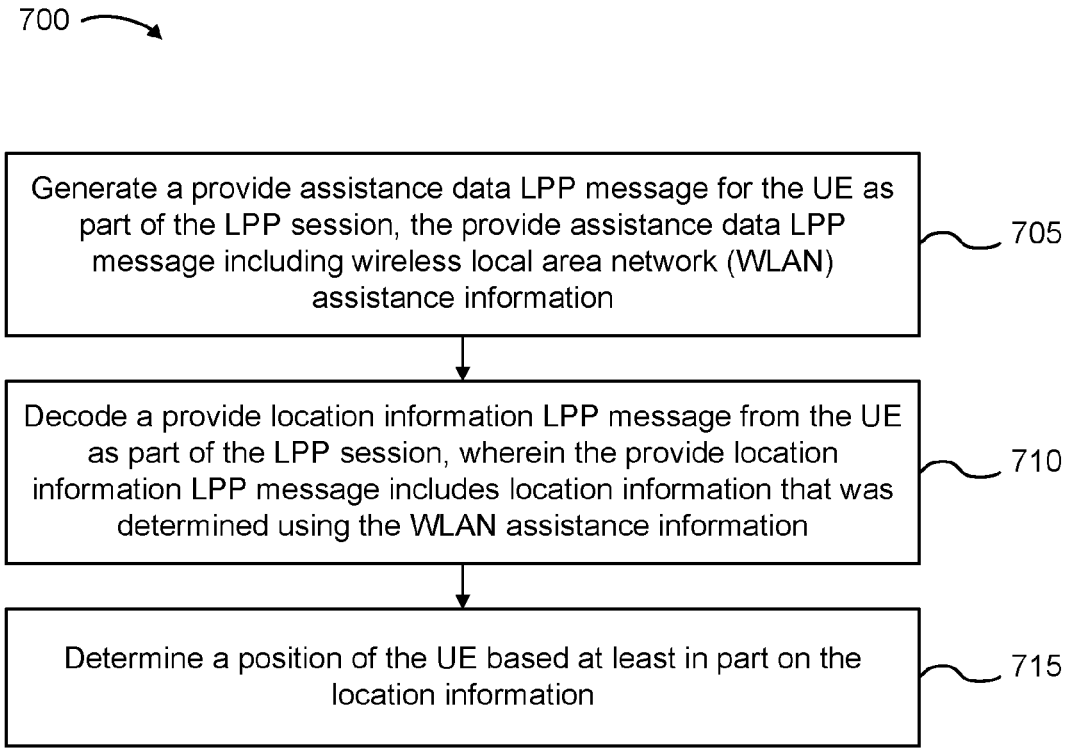
FIG. 7 is a flow diagram of a method for performing WLAN FTM.

FIG. 7 is a flow diagram of a method 700 for performing WLAN FTM. The method 700 is performed by a device, such as location server, E-SMLC, SLP, or the like. In particular, the method 700 may be performed by a processor within the device. Although the operations of method 700 are illustrated as being performed in a particular order, it is understood that the operations of method 700 may be reordered without departing from the scope of the method.

At 705, a provide assistance data LPP message is generated for the UE as part of the LPP session. The provide assistance data LPP message includes wireless local area network (WLAN) assistance information. At 710, a provide location information LPP message from the UE as part of the LPP session is decoded. The provide location information LPP message includes location information that was determined using the WLAN assistance information. In one example, the location information is location measurements associated with UE-assisted positioning methods. In another example, the location information is location estimates associated with UE-based positioning methods. At 715, a position of the UE is determined based at least in part on the location information.

The operations of method 700 may be performed by an application specific processor, programmable application specific integrated circuit (ASIC), field programmable gate array (FPGA), or the like.

Figure 8:
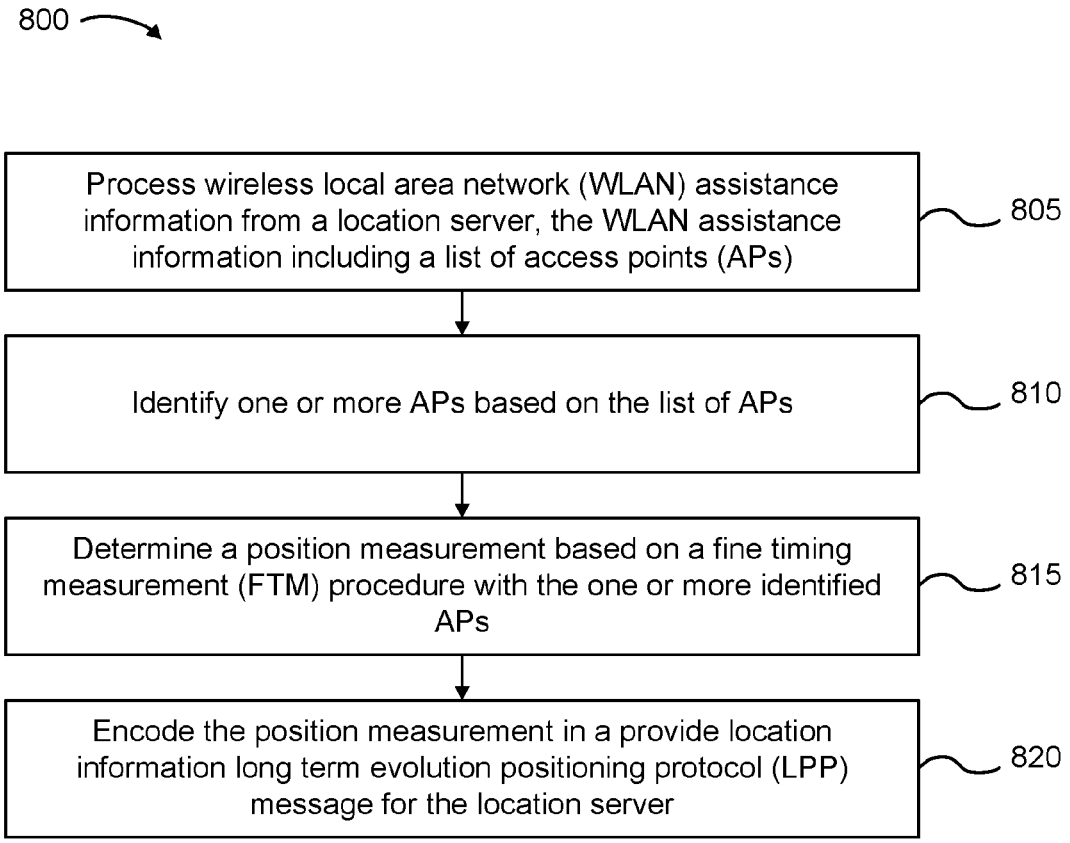
FIG. 8 is a flow diagram of a method for performing WLAN FTM.

FIG. 8 is a flow diagram of a method 800 for performing WLAN FTM. The method 800 is performed by a device, such as a user equipment (UE) or the like. In particular, the method 800 may be performed by a processor (e.g., a baseband processor) within the device. Although the operations of method 800 are illustrated as being performed in a particular order, it is understood that the operations of method 800 may be reordered without departing from the scope of the method.

At 805, wireless local area network (WLAN) assistance information from a location server is processed. At 810, one or more APs are identified based on the list of APs. At 815, a position measurement is determined based on a fine timing measurement (FTM) procedure with the one or more identified APs. At 820, the position measurement is encoded in a provide location information long term evolution positioning protocol (LPP) message for the location server.

The operations of method 800 may be performed by an application specific processor, programmable application specific integrated circuit (ASIC), field programmable gate array (FPGA), or the like.

Figure 9:
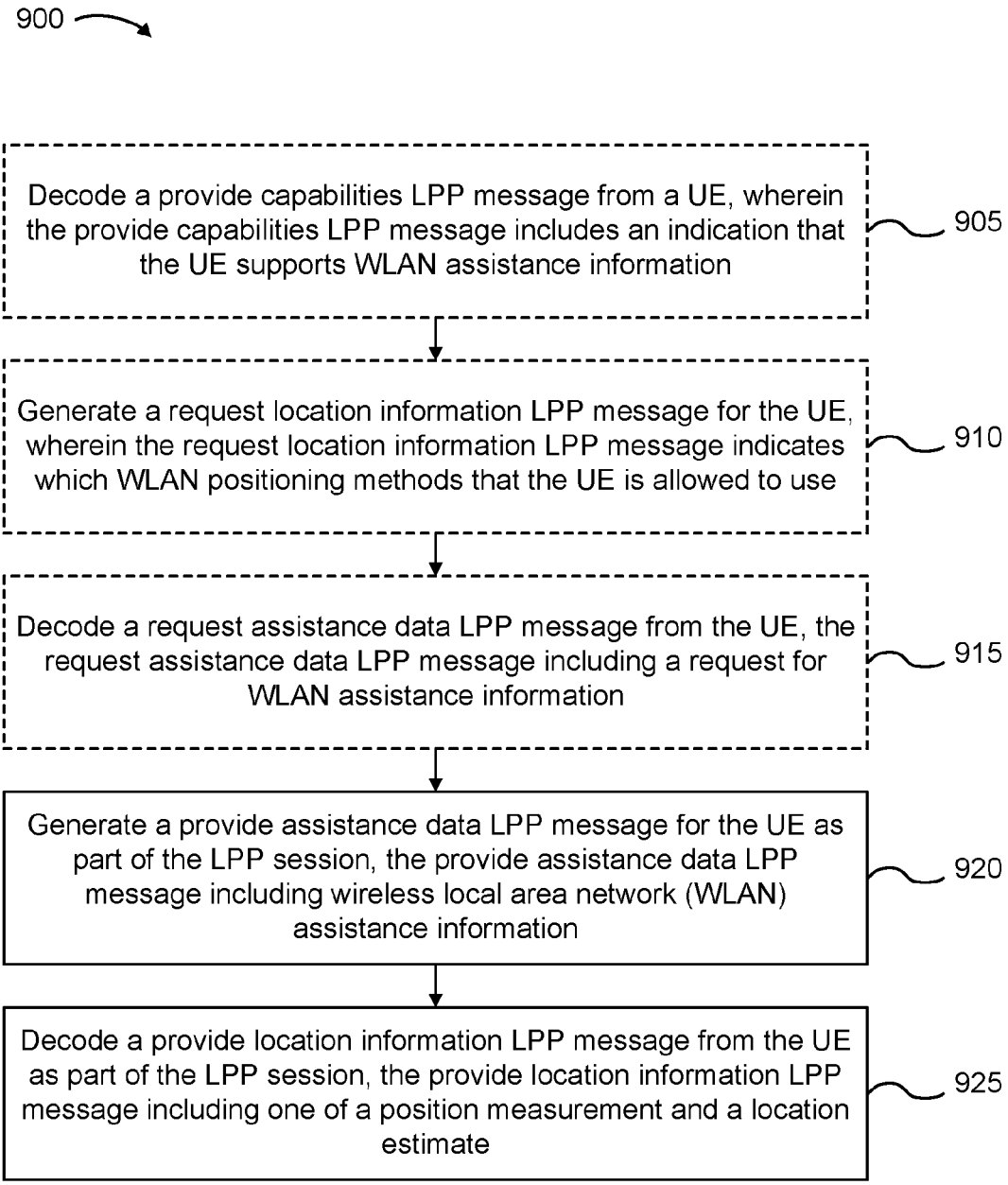
FIG. 9 is a flow diagram of a method for performing WLAN FTM.

FIG. 9 is a flow diagram of a method 900 for performing WLAN FTM. The method 900 is performed by a device, such as location server, E-SMLC, SLP, or the like. In particular, the method 900 may be performed by a processor within the device. Although the operations of method 900 are illustrated as being performed in a particular order, it is understood that the operations of method 900 may be reordered without departing from the scope of the method. Operations that are shown in dashed lines may be optionally included.

At 905, a provide capabilities LPP message from a UE is decoded. The provide capabilities LPP message includes an indication that the UE supports WLAN assistance information.

At 910, a request location information LPP message for the UE is generated. The request location information LPP message indicates which WLAN positioning methods that the UE is allowed to use.

At 915, a request assistance data LPP message from the UE is decoded. The request assistance data LPP message includes a request for WLAN assistance information.

At 920, a provide assistance data LPP message for the UE as part of the LPP session is generated. The provide assistance data LPP message includes wireless local area network (WLAN) assistance information.

At 925, a provide location information LPP message from the UE as part of the LPP session is decoded. The provide location information LPP message includes one of a position measurement and a location estimate.

The operations of method 900 may be performed by an application specific processor, programmable application specific integrated circuit (ASIC), field programmable gate array (FPGA), or the like.

Figure 10:
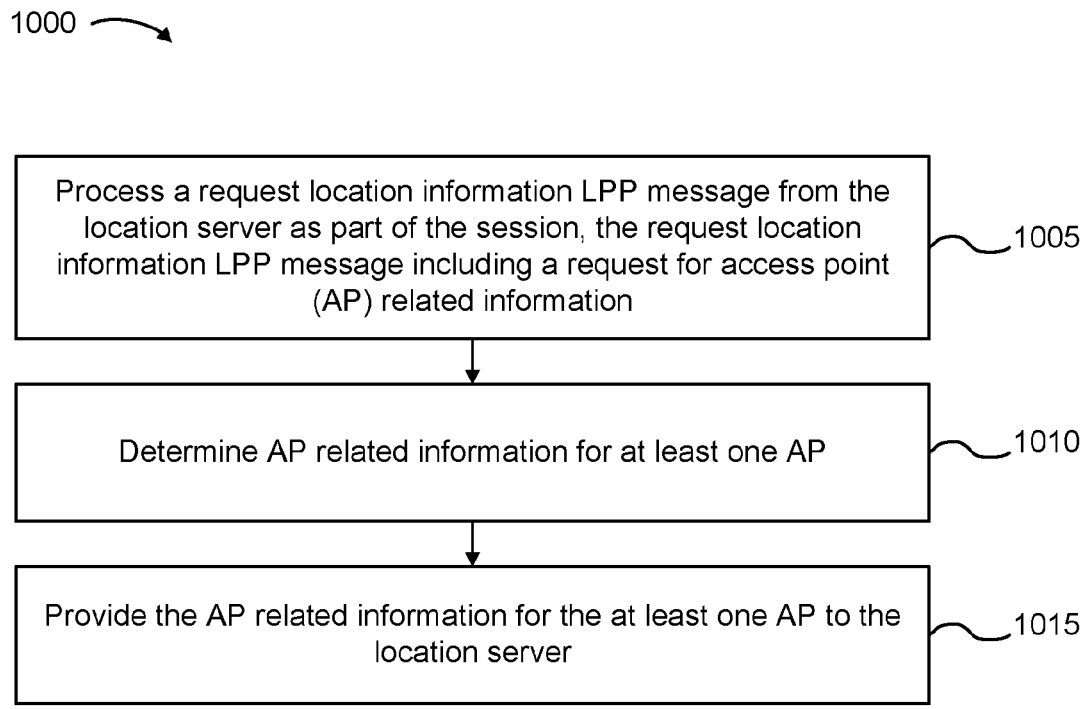
FIG. 10 is a flow diagram of a method for performing WLAN FTM.

FIG. 10 is a flow diagram of a method 1000 for performing WLAN FTM. The method 1000 is performed by a device, such as a user equipment (UE) or the like. In particular, the method 1000 may be performed by a processor (e.g., a baseband processor) within the device. Although the operations of method 1000 are illustrated as being performed in a particular order, it is understood that the operations of method 1000 may be reordered without departing from the scope of the method.

At 1005, a request location information LPP message from the location server as part of a session is processed. The request location information LPP message includes a request for access point (AP) related information. In some embodiments, the AP related information may include one or more of AP support for FTM, AP latitude and longitude, AP civic address, AP floor number, and the like (as described above). At 1010, AP related information for at least one AP is determined. At 1015, the AP related information for the at least one AP is provided to the location server.

The operations of method 1000 may be performed by an application specific processor, programmable application specific integrated circuit (ASIC), field programmable gate array (FPGA), or the like.

Figure 11:
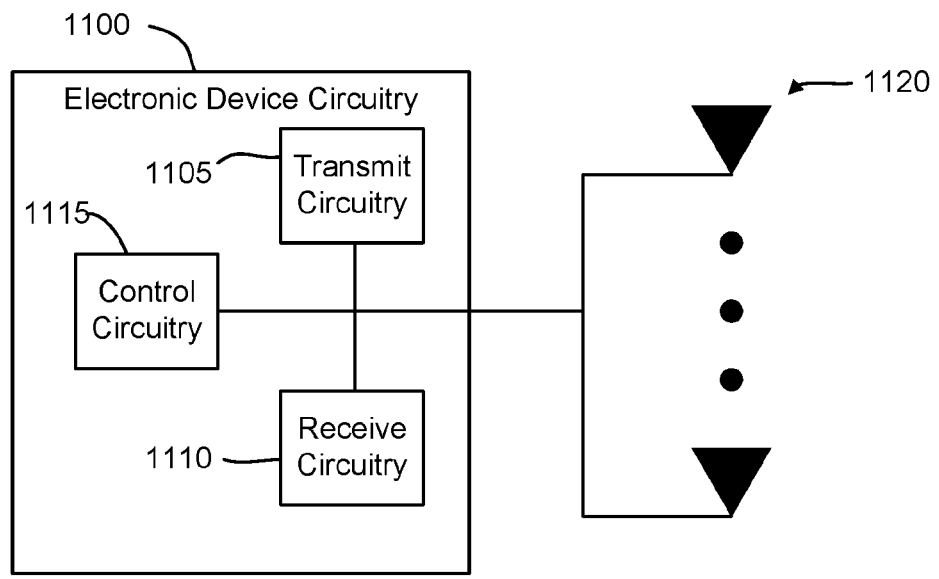
FIG. 11 is a block diagram illustrating electronic device circuitry in accordance with various embodiments.

FIG. 11 is a block diagram illustrating electronic device circuitry 1100 that may be radio access node (RAN) node circuitry (such as an eNB circuitry), UE circuitry, network node circuitry (such as a location server, E-SMLC, or SLP), or some other type of circuitry in accordance with various embodiments. In embodiments, the electronic device circuitry 1100 may be, or may be incorporated into or otherwise a part of, a RAN Node (e.g., an eNB), a UE, a mobile station (MS), a BTS, a network node, or some other type of electronic device. In embodiments, the electronic device circuitry 1100 may include radio transmit circuitry 1105 and receive circuitry 1110 coupled to control circuitry 1115 (e.g., baseband processor(s), etc.). In embodiments, the transmit circuitry 1105 and/or receive circuitry 1110 may be elements or modules of transceiver circuitry, as shown. In some embodiments, some or all of the control circuitry 1115 can be in a device separate or external from the transmit circuitry 1105 and the receive circuitry 1110 (baseband processors shared by multiple antenna devices, as in cloud-RAN (C-RAN) implementations, for example).

The electronic device circuitry 1100 may be coupled with one or more plurality of antenna elements 1120 of one or more antennas. The electronic device circuitry 1100 and/or the components of the electronic device circuitry 1100 may be configured to perform operations similar to those described elsewhere in this disclosure.

In embodiments where the electronic device circuitry 1100 is or is incorporated into or otherwise part of a UE, the transmit circuitry 1105 can transmit LPP messages as shown in FIGS. 1-5. The receive circuitry 1110 can receive LPP messages as shown in FIGS. 1-5.

In embodiments where the electronic device circuitry 1100 is an eNB, BTS and/or a network node, or is incorporated into or is otherwise part of an eNB, BTS and/or a network node, the transmit circuitry 1105 can transmit LPP messages as shown in FIGS. 1-5. The receive circuitry 1110 can receive LPP messages as shown in FIGS. 1-5.

In certain embodiments, the electronic device circuitry 1100 shown in FIG. 11 is operable to perform one or more methods, such as the methods shown in FIGS. 6-10.

As used herein, the term "circuitry" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 12:
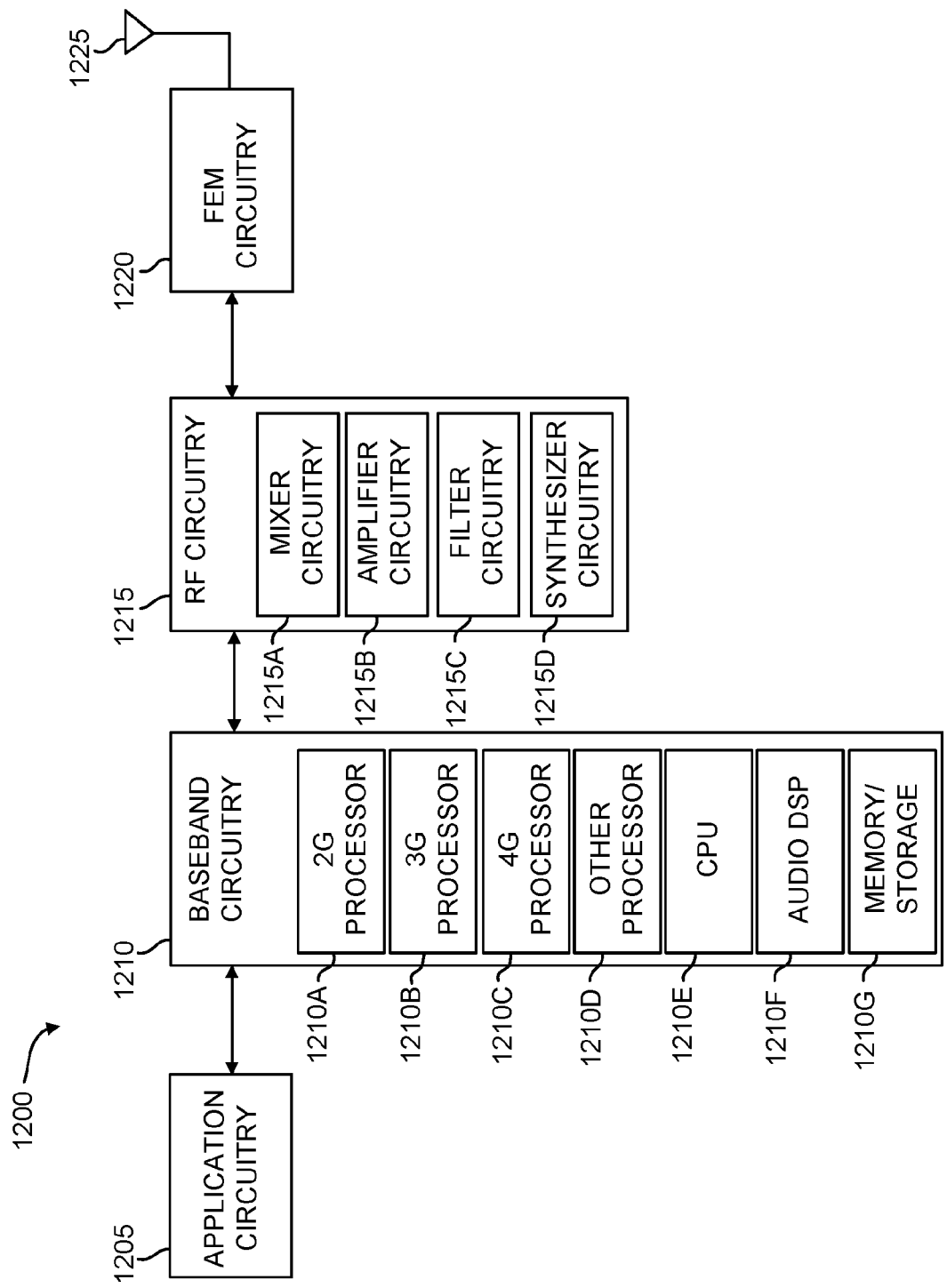
FIG. 12 is a block diagram illustrating, for one embodiment, example components of a user equipment (UE), mobile station (MS), evolved Node B (eNB), or location server.

Embodiments described herein may be implemented into a system using any suitably configured hardware and/or software. FIG. 12 is a block diagram illustrating, for one embodiment, example components of a user equipment (UE), mobile station (MS), evolved Node B (eNB), or location server, referred to herein generally as device 1200. In some embodiments, the device 1200 may include application circuitry 1205, baseband circuitry 1210, radio frequency (RF) circuitry 1215, front-end module (FEM) circuitry 1220, and one or more antennas 1225, coupled together at least as shown in FIG. 12.

The application circuitry 1205 may include one or more application processors. By way of non-limiting example, the application circuitry 1205 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1210 may include one or more single-core or multi-core processors. The baseband circuitry 1210 may include one or more baseband processors and/or control logic. The baseband circuitry 1210 may be configured to process baseband signals received from a receive signal path of the RF circuitry 1215. The baseband circuitry 1210 may also be configured to generate baseband signals for a transmit signal path of the RF circuitry 1215. The baseband circuitry 1210 may interface with the application circuitry 1205 for generation and processing of the baseband signals, and for controlling operations of the RF circuitry 1215.

By way of non-limiting example, the baseband circuitry 1210 may include at least one of a second generation (2G) baseband processor 1210A, a third generation (3G) baseband processor 1210B, a fourth generation (4G) baseband processor 1210C, other baseband processor(s) 1210D for other existing generations, and generations in development or to be developed in the future (e.g., fifth generation (5G), sixth generation (6G), etc.). The baseband circuitry 1210 (e.g., at least one of baseband processors 1210A-1210D) may handle various radio control functions that enable communication with one or more radio networks via the RF circuitry 1215. By way of non-limiting example, the radio control functions may include signal modulation/demodulation, encoding/decoding, radio frequency shifting, other functions, and combinations thereof. In some embodiments, modulation/demodulation circuitry of the baseband circuitry 1210 may be programmed to perform Fast-Fourier Transform (FFT), precoding, constellation mapping/demapping functions, other functions, and combinations thereof. In some embodiments, encoding/decoding circuitry of the baseband circuitry 1210 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1210 may include elements of a protocol stack. By way of non-limiting example, the elements of the protocol stack may be elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 1210E of the baseband circuitry 1210 may be programmed to run elements of the protocol stack for signaling of the PHY, MAC, RLC, PDCP and/or RRC layers. In some embodiments, the baseband circuitry 1210 may include one or more audio digital signal processor(s) (DSP) 1210F. The audio DSP(s) 1210F may include elements for compression/decompression and echo cancellation. The audio DSP(s) 1210F may also include other suitable processing elements.

The baseband circuitry 1210 may further include memory/storage 1210G. The memory/storage 1210G may include data and/or instructions for operations performed by the processors of the baseband circuitry 1210 stored thereon. In some embodiments, the memory/storage 1210G may include any combination of suitable volatile memory and/or non-volatile memory. The memory/storage 1210G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1210G may be shared among the various processors or dedicated to particular processors.

Components of the baseband circuitry 1210 may be suitably combined in a single chip or a single chipset, or disposed on a same circuit board in some embodiments. In some embodiments, some or all of the constituent components of the baseband circuitry 1210 and the application circuitry 1205 may be implemented together, such as, for example, on a system on a chip (SOC).

In some embodiments, the baseband circuitry 1210 may provide for communication compatible with one or more radio technologies. For example, in some embodiments, the baseband circuitry 1210 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 1210 is configured to support radio communications of more than one wireless protocol may be referred to as multi-mode baseband circuitry.

The RF circuitry 1215 may enable communication with wireless networks using modulated electromagnetic radiation through a non-solid medium. In various embodiments, the RF circuitry 1215 may include switches, filters, amplifiers, etc. to facilitate the communication with the wireless network. The RF circuitry 1215 may include a receive signal path which may include circuitry to down-convert RF signals received from the FEM circuitry 1220, and provide baseband signals to the baseband circuitry 1210. The RF circuitry 1215 may also include a transmit signal path which may include circuitry to up-convert baseband signals provided by the baseband circuitry 1210, and provide RF output signals to the FEM circuitry 1220 for transmission.

In some embodiments, the RF circuitry 1215 may include a receive signal path and a transmit signal path. The receive signal path of the RF circuitry 1215 may include mixer circuitry 1215A, amplifier circuitry 1215B, and filter circuitry 1215C. The transmit signal path of the RF circuitry 1215 may include filter circuitry 1215C and mixer circuitry 1215A. The RF circuitry 1215 may further include synthesizer circuitry 1215D configured to synthesize a frequency for use by the mixer circuitry 1215A of the receive signal path and the transmit signal path. In some embodiments, the mixer circuitry 1215A of the receive signal path may be configured to down-convert RF signals received from the FEM circuitry 1220 based on the synthesized frequency provided by synthesizer circuitry 1215D. The amplifier circuitry 1215B may be configured to amplify the down-converted signals.

The filter circuitry 1215C may include a low-pass filter (LPF) or band-pass filter (BPF) configured to remove unwanted signals from the down-converted signals to generate output baseband signals. Output baseband signals may be provided to the baseband circuitry 1210 for further processing. In some embodiments, the output baseband signals may include zero-frequency baseband signals, although this is not a requirement. In some embodiments, the mixer circuitry 1215A of the receive signal path may comprise passive mixers, although the scope of the embodiments is not limited in this respect.

In some embodiments, the mixer circuitry 1215A of the transmit signal path may be configured to up-convert input baseband signals based on the synthesized frequency provided by the synthesizer circuitry 1215D to generate RF output signals for the FEM circuitry 1220. The baseband signals may be provided by the baseband circuitry 1210 and may be filtered by the filter circuitry 1215C. The filter circuitry 1215C may include a low-pass filter (LPF), although the scope of the embodiments is not limited in this respect. In some embodiments, the mixer circuitry 1215A of the receive signal path and the mixer circuitry 1215A of the transmit signal path may include two or more mixers, and may be arranged for quadrature downconversion and/or upconversion, respectively. In some embodiments, the mixer circuitry 1215A of the receive signal path and the mixer circuitry 1215A of the transmit signal path may include two or more mixers and may be arranged for image rejection (e.g., Hartley image rejection). In some embodiments, the mixer circuitry 1215A of the receive signal path and the mixer circuitry 1215A of the transmit signal path may be arranged for direct downconversion and/or direct upconversion, respectively. In some embodiments, the mixer circuitry 1215A of the receive signal path and the mixer circuitry 1215A of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In such embodiments, the RF circuitry 1215 may include analog-to-digital converter (ADC) and digital-to-analog converter (DAC) circuitry, and the baseband circuitry 1210 may include a digital baseband interface to communicate with the RF circuitry 1215.

In some dual-mode embodiments, separate radio IC circuitry may be provided for processing signals for each spectrum, although the scope of the embodiments is not limited in this respect.

In some embodiments, the synthesizer circuitry 1215D may include one or more of a fractional-N synthesizer and a fractional N/N+1 synthesizer, although the scope of the embodiments is not limited in this respect as other types of frequency synthesizers may be suitable. For example, synthesizer circuitry 1215D may include a delta-sigma synthesizer, a frequency multiplier, a synthesizer comprising a phase-locked loop with a frequency divider, other synthesizers, and combinations thereof.

The synthesizer circuitry 1215D may be configured to synthesize an output frequency for use by the mixer circuitry 1215A of the RF circuitry 1215 based on a frequency input and a divider control input. In some embodiments, the synthesizer circuitry 1215D may be a fractional N/N+1 synthesizer.

In some embodiments, frequency input may be provided by a voltage controlled oscillator (VCO), although that is not a requirement. Divider control input may be provided by either the baseband circuitry 1210 or the application circuitry 1205 depending on the desired output frequency. In some embodiments, a divider control input (e.g., N) may be determined from a look-up table based on a channel indicated by the application circuitry 1205.

The synthesizer circuitry 1215D of the RF circuitry 1215 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In such embodiments, the delay elements may be configured to break a VCO period into $N_d$ equal packets of phase, where $N_d$ is the number of delay elements in the delay line. In this way, the DLL may provide negative feedback to help ensure that the total delay through the delay line is one VCO cycle.

In some embodiments, the synthesizer circuitry 1215D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1215 may include an IQ/polar converter.

The FEM circuitry 1220 may include a receive signal path which may include circuitry configured to operate on RF signals received from one or more antennas 1225, amplify the received signals, and provide the amplified versions of the received signals to the RF circuitry 1215 for further processing. The FEM circuitry 1220 may also include a transmit signal path which may include circuitry configured to amplify signals for transmission provided by the RF circuitry 1215 for transmission by at least one of the one or more antennas 1225.

In some embodiments, the FEM circuitry 1220 may include a TX/RX switch configured to switch between a transmit mode and a receive mode operation. The FEM circuitry 1220 may include a receive signal path and a transmit signal path. The receive signal path of the FEM circuitry 1220 may include a low-noise amplifier (LNA) to amplify received RF signals and provide the amplified received RF signals as an output (e.g., to the RF circuitry 1215). The transmit signal path of the FEM circuitry 1220 may include a power amplifier (PA) configured to amplify input RF signals (e.g., provided by RF circuitry 1215), and one or more filters configured to generate RF signals for subsequent transmission (e.g., by one or more of the one or more antennas 1225).

In some embodiments, the device 1200 may include additional elements such as, for example, memory/storage, a display, a camera, one or more sensors, an input/output (I/O) interface, other elements, and combinations thereof. In some embodiments, the device 1200 may be configured to perform one or more processes, techniques, and/or methods as described herein, or portions thereof.

EXAMPLES

The following examples pertain to further embodiments.

Example 1 is an apparatus for a user equipment (UE). The apparatus includes a memory to store session information for a long term evolution positioning protocol (LPP) session with a location server and one or more baseband processors. The one or more baseband processors are configured to decode a provide assistance data LPP message from the location server as part of the LPP session, where the provide assistance data LPP message includes wireless local area network (WLAN) assistance information; identify one or more access points (APs) based on the WLAN assistance information; and determine at least one position measurement based on a fine timing measurement (FTM) procedure with the one or more identified APs.

Example 2 is the apparatus of Example 1 or any of the other embodiments described herein, where the one or more baseband processors are further to encode the position measurement in a provide location information LPP message for the location server as part of the LPP session.

Example 3 is the apparatus of Example 1 or any of the other embodiments described herein, where the one or more baseband processors are further to determine a plurality of position measurements, compute a location estimate based on the plurality of position measurements, and encode the location estimate in a provide location information LPP message for the location server as part of the LPP session.

Example 4 is the apparatus of any of Examples 1, 2, or 3 or any of the other embodiments described herein, where the WLAN assistance information includes a list of identified APs.

Example 5 is the apparatus of Example 4 or any of the other embodiments described herein, where the WLAN assistance information includes location information for at least one AP in the list of identified APs.

Example 6 is the apparatus of Example 4 or any of the other embodiments described herein, where the WLAN assistance information includes channel information for at least one AP in the list of identified APs.

Example 7 is the apparatus of Example 4 or any of the other embodiments described herein, where the WLAN assistance information is included in a ProvideAssistanceData information element (IE).

Example 8 is the apparatus of any of Examples 1, 2, or 3 or any of the other embodiments described herein, where the one or more baseband processors are further to generate a request assistance data LPP message for the location server, the request assistance data LPP message including a request for WLAN assistance information.

Example 9 is the apparatus of Example 8 or any of the other embodiments described herein, where the request for WLAN assistance information includes a request for WLAN AP identity information.

Example 10 is the apparatus of Example 8 or any of the other embodiments described herein, where the request for WLAN assistance information includes a request for WLAN AP location information.

Example 11 is the apparatus of Example 8 or any of the other embodiments described herein, where the request for WLAN assistance information indicates a list of APs that are currently visible to the UE.

Example 12 is the apparatus of Example 8 or any of the other embodiments described herein, where the request for WLAN assistance information indicates a list of APs for which the UE has stored assistance data.

Example 13 is the apparatus of Example 8 or any of the other embodiments described herein, where the request for WLAN assistance information is included in a RequestAssistanceData IE.

Example 14 is the apparatus of any of Examples 1, 2, or 3 or any of the other embodiments described herein, where the one or more baseband processors are further to generate a provide capabilities LPP message for the location server as part of the LPP session, wherein the provide capabilities LPP message includes an indication that the apparatus supports WLAN assistance information, and wherein the indication that the apparatus supports WLAN assistance information is included in a wlan-AP-AD-Supported field.

Example 15 is the apparatus of any of Examples 1, 2, or 3 or any of the other embodiments described herein, where the one or more baseband processors are further to decode a request location information LPP message from the location server, wherein the request location information LPP message indicates which WLAN positioning methods that the apparatus is allowed to use.

Example 16 is an apparatus for a location server. The apparatus includes a memory to store session information for an LPP session with a UE, and one or more processing units to generate a provide assistance data LPP message for the UE as part of the LPP session, the provide assistance data LPP message including WLAN assistance information; decode a provide location information LPP message from the UE as part of the LPP session, wherein the provide location information LPP message includes location information that was determined using the WLAN assistance information; and determine a position of the UE based at least in part on the location information.

Example 17 is the apparatus of Example 16 or any of the other embodiments described herein, where the location information includes a position measurement when the UE is in a UE-assisted mode and wherein the location information includes a location estimate when the UE is in a UE-based mode.

Example 18 is the apparatus of Example 16 or any of the other embodiments described herein, where the one or more processing units are further to decode a request assistance data LPP message from the UE, the request assistance data LPP message including a request for WLAN assistance information, wherein the provide assistance data LPP message is generated in response to the decoding of the request assistance data LPP message.

Example 19 is the apparatus of any of Examples 16-18 or any of the other embodiments described herein, where the one or more processing units are further to generate a request location information LPP message for the UE, wherein the request location information LPP message indicates which WLAN positioning methods that the UE is allowed to use and if the UE is allowed to request WLAN data.

Example 20 is the apparatus of any of Examples 16-18 or any of the other embodiments described herein, where the one or more processing units are further to decode a provide capabilities LPP message from the UE, wherein the provide capabilities LPP message includes an indication that the UE supports WLAN assistance information, and wherein the indication that the UE supports WLAN assistance information is included in a wlan-AP-AD-Supported IE.

Example 21 is the apparatus of any of Examples 16-18 or any of the other embodiments described herein, where the provide location information LPP message includes AP related information for an AP, wherein the AP related information comprises at least one of FTM capability of the AP, latitude of the AP, longitude of the AP, civic address of the AP, channel of the AP, altitude of the AP, height of the AP from a floor, and floor number of the AP.

Example 22 is the apparatus of any of Examples 16-18 or any of the other embodiments described herein, where the WLAN assistance information includes a list of identified APs.

Example 23 is the apparatus of Example 22 or any of the other embodiments described herein, where the WLAN assistance information includes location information for at least one AP in the list of identified APs or an error-cause if the location information is not available.

Example 24 is the apparatus of Example 23 or any of the other embodiments described herein, where the WLAN assistance information includes channel information for at least one AP in the list of identified APs.

Example 25 is a computer-readable medium having instructions stored thereon, the instructions, when executed by a computing device, cause the computing device to process WLAN assistance information from a location server, the WLAN assistance information including a list of APs, identify one or more APs based on the list of APs, determine a position measurement based on an FTM procedure with the one or more identified APs, and encode the position measurement in a provide location information LPP message for the location server.

Example 26 is the computer-readable medium of Example 25 or any of the other embodiments described herein, where the WLAN assistance information is obtained from the location server in a provide assistance data LPP message.

Example 27 is the computer-readable medium of Example 25 or any of the other embodiments described herein, where the instructions further cause the computing device to decode a LPP request location information message from the location server, wherein the LPP request location information message indicates which WLAN positioning methods that the apparatus is allowed to use.

Example 28 is the computer-readable medium of any of Examples 25-27 or any of the other embodiments described herein, where the list of APs includes information about an AP in the list of APs.

Example 29 is the computer-readable medium of Example 28 or any of the other embodiments described herein, where the information includes channel information for the AP in the list of APs.

Example 30 is the computer-readable medium of Example 28 or any of the other embodiments described herein, where the information includes location information for the AP in the list of APs.

Example 31 is a computer-readable medium having instructions stored thereon, the instructions, when executed by a computing device, cause the computing device to generate a provide assistance data LPP message for the UE as part of the LPP session, the provide assistance data LPP message including WLAN assistance information; decode a provide location information LPP message from the UE as part of the LPP session, wherein the provide location information LPP message includes location information that was determined using the WLAN assistance information; and determine a position of the UE based at least in part on the location information.

Example 32 is the computer-readable medium of Example 31 or any of the other embodiments described herein, where the location information includes a position measurement when the UE is in a UE-assisted mode and wherein the location information includes a location estimate when the UE is in a UE-based mode.

Example 33 is an apparatus for a UE that includes a cellular transceiver to communicate via a cellular link, a WLAN transceiver to communicate via a WLAN link and a positioning module configured to perform WLAN FTM positioning.

Example 34 is the apparatus of Example 33 or any of the other embodiments described herein, where the said positioning module is further configured to receive assistance data from the location server. The location data may contain: AP list (e.g., AP identifier), AP locations, AP channels and other information. The said positioning module is further configured to perform FTM measurements with the AP received from the location server as part of the assistance information.

Example 35 is the apparatus of Example 34 or any of the other embodiments described herein, where the said positioning module is further configured to calculate absolute coordinates, using FTM measurements with the APs received from the location server and taking into account their coordinates.

Example 36 is the apparatus of Example 33 or any of the other embodiments described herein, where the apparatus is further configured to report to the location server information about neighboring APs, including their civic address and floor number.

Example 37 is an apparatus for performing any of the methods or embodiments described herein.

Example 38 is a computer-readable medium for performing any of the methods or embodiments described herein.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus for a user equipment (UE), the apparatus comprising:
   a memory to store session information for a long term evolution positioning protocol (LPP) session with a location server; and
   a baseband processor to:
   generate a request assistance data LPP message for the location server, the request assistance data LPP message including a request for wireless local area network (WLAN) assistance information, wherein the request for WLAN assistance information indicates a list of access points (APs) that are currently visible to the UE;
   decode a provide assistance data LPP message from the location server as part of the LPP session, the provide assistance data LPP message including WLAN assistance information;
   identify an AP based on the WLAN assistance information;
   determine at least one position measurement based on a fine timing measurement (FTM) procedure with the identified AP; and
   generate a provide capabilities LPP message for the location server as part of the LPP session, wherein the provide capabilities LPP message includes an indication that the apparatus supports WLAN assistance information, and wherein the indication that the apparatus supports WLAN assistance information is included in a wlan-AP-AD-Supported field.

2. The apparatus of claim 1, wherein the baseband processor is further to:
encode the position measurement in a provide location information LPP message for the location server as part of the LPP session.

3. The apparatus of claim 1, wherein the baseband processor is further to:
determine a plurality of position measurements;
compute a location estimate based on the plurality of position measurements; and
encode the location estimate in a provide location information LPP message for the location server as part of the LPP session.

4. The apparatus of claim 1, wherein the WLAN assistance information includes a list of identified APs.

5. The apparatus of claim 4, wherein the WLAN assistance information includes location information for at least one AP in the list of identified APs.

6. The apparatus of claim 4, wherein the WLAN assistance information includes channel information for at least one AP in the list of identified APs.

7. The apparatus of claim 4, wherein the WLAN assistance information is included in a ProvideAssistanceData information element (IE).

8. The apparatus of claim 1, wherein the request for WLAN assistance information includes a request for WLAN AP identity information.

9. The apparatus of claim 1, wherein the request for WLAN assistance information includes a request for WLAN AP location information.

10. The apparatus of claim 1, wherein the request for WLAN assistance information indicates a list of APs for which the UE has stored assistance data.

11. The apparatus of claim 1, wherein the request for WLAN assistance information is included in a RequestAssistanceData IE.

12. The apparatus of claim 1, wherein the baseband processor is further to:
decode a request location information LPP message from the location server, wherein the request location information LPP message indicates which WLAN positioning methods that the apparatus is allowed to use.

13. An apparatus for a location server, comprising:
a memory to store session information for a long term evolution positioning protocol (LPP) session with a user equipment (UE); and
one or more processing units to:
decode a request assistance data LPP message from the UE, the request assistance data LPP message including a request for wireless local area network (WLAN) assistance information, wherein the request for WLAN assistance information indicates a list of access points (APs) that are currently visible to the UE;
generate a provide assistance data LPP message for the UE as part of the LPP session, the provide assistance data LPP message including WLAN assistance information;
decode a provide location information LPP message from the UE as part of the LPP session, wherein the provide location information LPP message includes location information that was determined using the WLAN assistance information;
determine a position of the UE based at least in part on the location information; and
decode a provide capabilities LPP message from the UE, wherein the provide capabilities LPP message includes an indication that the UE supports WLAN assistance information, and wherein the indication that the UE supports WLAN assistance information is included in a wlan-AP-AD-Supported information element (IE).

14. The apparatus of claim 13, wherein the location information includes a position measurement when the UE is in a UE-assisted mode and wherein the location information includes a location estimate when the UE is in a UE-based mode.

15. The apparatus of claim 13, wherein the provide assistance data LPP message is generated in response to the decoding of the request assistance data LPP message.

16. The apparatus of claim 13, wherein the one or more processing units are further to:
generate a request location information LPP message for the UE, wherein the request location information LPP message indicates which WLAN positioning methods that the UE is allowed to use and if the UE is allowed to request WLAN data.

17. The apparatus of claim 13, wherein the provide location information LPP message includes AP related information for an AP, wherein the AP related information comprises at least one of fine timing measurement (FTM) capability of the AP, latitude of the AP, longitude of the AP, civic address of the AP, channel of the AP, altitude of the AP, height of the AP from a floor, and floor number of the AP.

18. The apparatus of claim 13, wherein the WLAN assistance information includes a list of identified APs.

19. The apparatus of claim 18, wherein the WLAN assistance information includes location information for at least one AP in the list of identified APs or an error-cause if the location information is not available, and wherein the WLAN assistance information includes channel information for at least one AP in the list of identified APs.

20. A non-transitory computer-readable medium having instructions stored thereon, the instructions, when executed by a computing device, cause the computing device to:
generate a request assistance data long term evolution positioning protocol (LPP) message for a location server, the request assistance data LPP message including a request for wireless area network (WLAN) assistance information;
process WLAN assistance information from the location server, the WLAN assistance information including a list of APs, wherein the list of APs includes APs that are known to the location server;
identify one or more APs based on the list of APs;
determine a position measurement based on a fine timing measurement (FTM) procedure with the one or more identified APs;
encode the position measurement in a provide location information LLP message for the location server; and
generate a provide capabilities LPP message for the location server, wherein the provide capabilities LPP message includes an indication that the computing device supports WLAN assistance information, and wherein the indication that the computing supports WLAN assistance information is included in a wlan-AP-AD-Supported field.

21. The non-transitory computer-readable medium of claim 20, wherein the WLAN assistance information is obtained from the location server in a provide assistance data LPP message.

* * * * *